United States Patent
Ramamurthy et al.

(10) Patent No.: US 11,740,624 B2
(45) Date of Patent: Aug. 29, 2023

(54) ADVANCED CONTROL SYSTEM WITH MULTIPLE CONTROL PARADIGMS

(71) Applicant: SRI International, Menlo Park, CA (US)

(72) Inventors: Bhaskar Ramamurthy, Los Altos, CA (US); Supun Samarasekera, Skillman, NJ (US); Thomas Low, Belmont, CA (US); Manish Kothari, San Carlos, CA (US); John Peter Marcotullio, Morgan Hill, CA (US); Jonathan Brookshire, Princeton, NJ (US); Tobenna Arodiogbu, San Francisco, CA (US); Usman Ghani, Pacifica, CA (US)

(73) Assignee: SRI INTERNATIONAL, Menlo Park, CA (US)

(*) Notice: Subject to any disclaimer, the term of this patent is extended or adjusted under 35 U.S.C. 154(b) by 317 days.

(21) Appl. No.: 16/639,216

(22) PCT Filed: Aug. 17, 2018

(86) PCT No.: PCT/US2018/000280
§ 371 (c)(1),
(2) Date: Feb. 14, 2020

(87) PCT Pub. No.: WO2019/035997
PCT Pub. Date: Feb. 21, 2019

(65) Prior Publication Data
US 2020/0218253 A1 Jul. 9, 2020

Related U.S. Application Data

(60) Provisional application No. 62/547,039, filed on Aug. 17, 2017.

(51) Int. Cl.
*G05D 1/00* (2006.01)
*B60W 60/00* (2020.01)
(Continued)

(52) U.S. Cl.
CPC ......... *G05D 1/0022* (2013.01); *B60W 60/001* (2020.02); *G05B 17/02* (2013.01);
(Continued)

(58) Field of Classification Search
None
See application file for complete search history.

(56) References Cited

U.S. PATENT DOCUMENTS 5,231,693 A * 7/1993 Backes ................. B25J 9/1689
318/568.1
5,656,845 A 7/1997 Gudat et al.
(Continued)

OTHER PUBLICATIONS

Baybutt et al., "CS226 Snippet Updates: RadCam," retrieved from https://docs.google.com/document/d/1SFOnMTAU622A6evWIGK5q1I_akrhe-hEPy3SviRYTjs/edit on Sep. 3, 2020, 20 pp.

(Continued)

*Primary Examiner* — Jelani A Smith
*Assistant Examiner* — Davin Seol
(74) *Attorney, Agent, or Firm* — Shumaker & Sieffert, P.A.

(57) ABSTRACT

A hybrid control system includes a control agent and a control engine. The control engine is configured to install a master plan to the control agent. The master plan includes a plurality of high-level tasks. The control agent is configured to operate according to the master plan to, for each high-level task of the high-level tasks, obtain one or more low-level controls and to perform the one or more low-level controls to realize the high-level task. The control agent is configured to operate according to the master plan to transition between the plurality of high-level tasks thereby causing a seamless transition between operating at least partially autonomously and operating at least partially based on input from the tele-operator, based at least on context for the control agent, to operate at least partially autonomously and at least partially based on input from the tele-operator during execution of the master plan.

20 Claims, 27 Drawing Sheets

(51) Int. Cl.
    *G05B 17/02* (2006.01)
    *G05D 1/10* (2006.01)
(52) U.S. Cl.
    CPC .......... *G05D 1/0088* (2013.01); *G05D 1/101* (2013.01); *G05D 2201/0216* (2013.01)

(56) References Cited

U.S. PATENT DOCUMENTS

| | | | |
|---|---|---|---|
| 6,633,800 | B1 | 10/2003 | Ward et al. |
| 7,894,951 | B2 | 2/2011 | Norris et al. |
| 8,271,132 | B2 * | 9/2012 | Nielsen ................ B25J 9/1666 |
| | | | 700/250 |
| 8,392,065 | B2 | 3/2013 | Tolstedt et al. |
| 9,036,693 | B2 | 5/2015 | Isnardi et al. |
| 9,210,444 | B2 | 12/2015 | Isnardi et al. |
| 9,212,926 | B2 | 12/2015 | Attard et al. |
| 9,476,730 | B2 | 10/2016 | Samarasekera et al. |
| 9,488,492 | B2 | 11/2016 | Samarasekera et al. |
| 9,606,539 | B1 * | 3/2017 | Kentley ................ G05D 1/0088 |
| 11,106,218 | B2 * | 8/2021 | Levinson ................ G01C 21/26 |
| 2005/0287038 | A1 | 12/2005 | Dubrovsky et al. |
| 2007/0125910 | A1 * | 6/2007 | Cepollina .............. B64G 1/007 |
| | | | 244/172.6 |
| 2011/0106339 | A1 * | 5/2011 | Phillips ................ G05D 1/0033 |
| | | | 701/2 |
| 2012/0095651 | A1 | 4/2012 | Anderson |
| 2013/0011234 | A1 | 1/2013 | Pretlove et al. |
| 2014/0269910 | A1 | 9/2014 | Chai |
| 2016/0334230 | A1 * | 11/2016 | Ross ................ G01C 21/3415 |
| 2018/0056505 | A1 * | 3/2018 | Kuffner ................ B25J 9/0084 |
| 2018/0136651 | A1 * | 5/2018 | Levinson .............. B60W 30/00 |
| 2018/0141544 | A1 * | 5/2018 | Xiao ...................... B60W 10/10 |
| 2018/0154899 | A1 * | 6/2018 | Tiwari ................. G05D 1/0217 |
| 2018/0284759 | A1 * | 10/2018 | Michalakis ......... B60W 50/082 |
| 2019/0011912 | A1 * | 1/2019 | Lockwood ........... G05D 1/0027 |
| 2020/0047337 | A1 * | 2/2020 | Williams ................ B25J 9/163 |
| 2020/0050190 | A1 * | 2/2020 | Patel .................... G05D 1/0027 |
| 2021/0205986 | A1 * | 7/2021 | Kalouche ................ B25J 9/163 |

OTHER PUBLICATIONS

Chiu et al., "Robust Vision-Aided Navigation Using Sliding-Window Factor Graphs," 2013 IEEE International Conference on Robotics and Automation (ICRA), May 2013, 8 pp.
Dorais et al., "Adjustable Autonomy for Human-Centered Autonomous Systems on Mars" International Joint Conferences on Artificial Intelligence (IJCAI), 1999, 20 pp. (Applicant points out, in accordance with MPEP 609.04(a), that the year of publication, 1999, is sufficiently earlier than the effective U.S. filing date, so that the particular month of publication is not in issue.).
Dorneich et al., "Mixed-Initiative Control of a Roadside Air Vehicle for Non-Pilots," Journal of Human-Robot Interaction, vol. 4, No. 3, Dec. 2015, 24 pp.
GitHub comma ai openpilot/pathplanner, retrieved from https://github.com/commaai/openpilot/blob/master/selfdrive/controls/lib/pathplanner.py on Sep. 3, 2020, 6 pp.
Goodrich et al. "Experiments in Adjustable Autonomy," American Association for Artificial Intelligence, 2001, 7 pp. (Applicant points out, in accordance with MPEP 609.04(a), that the year of publication, 2001, is sufficiently earlier than the effective U.S. filing date, so that the particular month of publication is not in issue.).
Kay et al., "Semi-Autonomous Vehicle Teleoperation Across Low-Bandwidth or High-Delay Transmission Links," International Joint Conference on Artificial Intelligence, Jan. 1995, 14 pp.
Kumar et al., "Augmented Reality Training for Forward Observers," Interservice/Industry Training, Simulation, and Education Conference (I/ITSEC) 2013, 12 pp. (Applicant points out, in accordance with MPEP 609.04(a), that the year of publication, 2013, is sufficiently eadier than the effective U.S. filing date, so that the particular month of publication is not in issue.).
Kumar et al., "Implementation of an Augmented Reality System for Training Dismounted Warfighters," Interservice/Industry Training, Simulation, and Education Conference (I/ITSEC) 2012, 12 pp. (Applicant points out, in accordance with MPEP 609.04(a), that the year of publication, 2012, is sufficiently earlier than the effective U.S. filing date, so that the particular month of publication is not in issue.).
Liu et al., "Remote Driving: A Ready-to-go Approach to Autonomous Car?—Oppodunities and Challenges," Rutgers University Libraries, Feb. 2015,7 pp.
Montemerlo et al., "Junior: The Stanford Entry in the Urban Challenge," Journal of Field Robotics, vol. 25, No. 9, Sep. 2008, 31 pp.
Murali et al., "Utilizing Semantic Visual Landmarks for Precise Vehicle Navigation," 2017 IEEE 20th International Conference on Intelligent Transportation Systems (ITSC), Oct. 2017, 8 pp.
"Scotty investigations", retrieved from https://quip.com/nzGzAOsShvQo, on Sep. 3, 2020, 17 pp.
Scotty Labs—Command Center for Autonomous Trucking, retrieved from https://docs.google.com/presentation/d/18KCOUi3CgO_MUz9ZydA-tzpVaHXI87Fy-hP008AVddg/edit#slide=id.g19c2faf61c_0_71 on Sep. 3, 2020, 4 pp.
Thrun et al., "Stanley: The Robot that Won the DARPA Grand Challenge," Journal of Field Robotics, vol. 23, No. 9, Jan. 2006, 32 pp.
YouTube, "Volvo Trucks—Look Who's Driving feat. 4-year-old Sophie (Live Test)," retrieved from https://www.youtube.com/watch?v=7kx67NnuSd0 on Sep. 3, 2020, 3 pp.
International Search Report and Written Opinion of International Application No. PCT/US2018/00280, dated Dec. 7, 2018, 7 pp.
International Preliminary Report on Patentability from International Application No. PCT/US2018/00280, dated Feb. 27, 2020, 6 pp.

* cited by examiner

MASTER PLAN (TRUCKS) 400C

| | |
|---|---|
| 422A — LOCATION 1 | TELEOP CONTROL |
| 422B — LOCATION 2 | TELEOP CONTROL |
| 422C — LOCATION 3 | AUTONOMOUS CONTROL |
| 422D — LOCATION 4 | AUTONOMOUS CONTROL |
| 422E — LOCATION 5 | TELEOP CONTROL |
| ... | ... |

FIG. 4C

STRONG CONTROL WITH LOCATION AND ACTIVITY FOR HOME ROBOT
⎯900A

| LOCATION | ACTIVITY | HIGH LEVEL CONTROL |
|---|---|---|
| KITCHEN | STACKING PLATES IN THE CABINET | PICK UP PLATE WITH GRASPER |
| KITCHEN | | STEP BACK 2 FEET FROM COUNTER |
| KITCHEN | | EXTEND ARM AT 30 DEG |

FIG. 9A

STRONG CONTROL WITH LOCATION, ACTIVITY, AND ENVIRONMENTAL CONDITIONS FOR TRUCKS
⎯900B

| LOCATION | ACTIVITY | ENVIRONMENTAL CONDITIONS | HIGH LEVEL CONTROL |
|---|---|---|---|
| LATITUDE AND LONGITUDE | U TURN ON A STREET | 2 INCH RAIN | GO TO THE LEFT MOST LANE |
| | | | PROCEED AT 2 MPH |
| | | | GO 5 FEET STRAIGHT INTO THE INTERSECTION |
| | | | MAKE A 5 DEGREE RIGHT TURN |
| | | | MAKE A 170 DEGREE LEFT TURN |

FIG. 9B

MASTER PLAN (TRUCKS)

| LOCATION | WEATHER | TIME | CONTROL |
|---|---|---|---|
| LOCATION 1 | RAIN | 9AM | TELEOP CONTROL 1 |
| LOCATION 1 | CLEAR | 10AM | TELEOP CONTROL 2 |
| LOCATION 2 | SNOW | 9AM | TELEOP CONTROL 3 |
| LOCATION 4 | CLEAR | 11AM | TELEOP CONTROL 4 |
| LOCATION 5 | CLEAR | 12PM | AUTONOMOUS CONTROL |
| . . . | . . . | . . . | . . . |

FIG. 14

ADVANCED CONTROL SYSTEM WITH MULTIPLE CONTROL PARADIGMS

This application claims the benefit of U.S. Provisional Application No. 62/547,039 by Ramamurthy et al., entitled "ADVANCED CONTROL SYSTEM WITH MULTIPLE CONTROL PARADIGMS," and filed on Aug. 17, 2017. The entire contents of Application No. 62/547,039 is incorporated herein by reference.

TECHNICAL FIELD

This disclosure relates generally to techniques for an autonomous controller, and more specifically an autonomous controller adapted for switching between teleoperation and autonomous operation on a task by task basis.

BACKGROUND

Control systems for a vehicle may involve a use of autonomous control systems where the control system controls the vehicle without control commands from a human being. For instance, an automobile can be controlled for lane following and adjusting for speed of other automobiles using autonomous control (e.g., advanced cruise control). In more complicated and inconsistent applications, control systems may use tele-operated control (or "tele-control") in which the control system controls the vehicle according to control commands from a human being. For example, a truck can be controlled remotely using tele-control when traveling through streets of a city.

SUMMARY

In general, the disclosure describes techniques for a hybrid control system which allows for switching between tele-operated control and autonomous control on a task-by-task basis. For example, the hybrid control system for an agent of the system, such as a robot or a vehicle, may perform some high-level tasks of a master plan using autonomous control. For instance, the hybrid control system may control simple tasks in a consistent environment using autonomous control. In this example, the hybrid control system for the agent may perform some high-level tasks of a master plan using tele-control. For instance, the hybrid control system may control complex tasks in an inconsistent environment using tele-control.

For example, a control engine may install a master plan to a control agent that is a vehicle, robot, or other type of agent. The master plan may include at least one high-level task for which the control agent is operating at least partially autonomously and at least one high-level task for which the control agent is operating at least partially based on input from a tele-operator. In this example, the control agent may transition between high-level tasks of the master plan based on context for the agent (e.g., environmental conditions) to cause the control agent to operate autonomously and operate using tele-control during execution of the master plan.

The techniques may provide one or more technical advantages. For example, a hybrid control system may permit reliable control of a control agent during normal activities under natural conditions where an environment may change between being consistent and inconsistent and/or where tasks may change between simple and complex. Unlike other techniques for autonomous control or tele-control, the techniques may be less prone to errors of autonomous control arising from complex actions or inconsistent environments and may respond quicker (e.g., without latency) than control systems using tele-control.

In an example, a hybrid control system includes a control agent and a control engine comprising one or more processors. The control engine is configured to install a master plan to the control agent, wherein the master plan comprises a plurality of high-level tasks, wherein the plurality of high-level tasks includes at least one task for which the control agent is operating at least partially autonomously, wherein the plurality of high-level tasks includes at least one task for which the control agent is operating at least partially based on input from a tele-operator, wherein the control agent is configured to operate according to the master plan to, for each high-level task of the high-level tasks, obtain one or more low-level controls and to perform the one or more low-level controls to realize the high-level task, and wherein the control agent is configured to operate according to the master plan to transition between the plurality of high-level tasks thereby causing a seamless transition between operating at least partially autonomously and operating at least partially based on input from the tele-operator, based at least on a context for the control agent, to operate at least partially autonomously and at least partially based on input from the tele-operator during execution of the master plan.

In some examples, a method for a hybrid control system includes installing, by a control engine comprising one or more processors, a master plan to a control agent, wherein the master plan comprises a plurality of high-level tasks, wherein the plurality of high-level tasks includes at least one task for which the control agent is operating at least partially autonomously, wherein the plurality of high-level tasks includes at least one task for which the control agent is operating at least partially based on input from a tele-operator, operating, by the control agent, according to the master plan to, for each high-level task of the high-level tasks, obtain one or more low-level controls and to perform the one or more low-level controls to realize the high-level task, and operating, by the control agent, according to the master plan to transition between the plurality of high-level tasks thereby causing a seamless transition between operating at least partially autonomously and operating at least partially based on input from the tele-operator, based at least on a context for the control agent, to operate at least partially autonomously and at least partially based on input from the tele-operator during execution of the master plan.

In some examples, a non-transitory computer-readable medium including instructions that, when executed, cause one or more processors to install a master plan to a control agent, wherein the master plan comprises a plurality of high-level tasks, wherein the plurality of high-level tasks includes at least one task for which the control agent is operating at least partially autonomously, wherein the plurality of high-level tasks includes at least one task for which the control agent is operating at least partially based on input from a tele-operator, operate according to the master plan to, for each high-level task of the high-level tasks, obtain one or more low-level controls and to perform the one or more low-level controls to realize the high-level task, and operate according to the master plan to transition between the plurality of high-level tasks thereby causing a seamless transition between operating at least partially autonomously and operating at least partially based on input from the tele-operator, based at least on a context for the control agent, to operate at least partially autonomously and at least partially based on input from the tele-operator during execution of the master plan.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 4C is a table illustrating an example master plan for a truck in accordance with the techniques of the disclosure.

FIG. 9A is a first table illustrating an example structure of a map for a home or service robot in accordance with the techniques of the disclosure.

FIG. 9B is a second table illustrating an example structure of a map for a truck in accordance with the techniques of the disclosure.

FIG. 14 is a table illustrating an example master plan for trucks in accordance with the techniques of the disclosure.

Like reference characters refer to like elements throughout the figures and description.

DETAILED DESCRIPTION

Figure 1A:
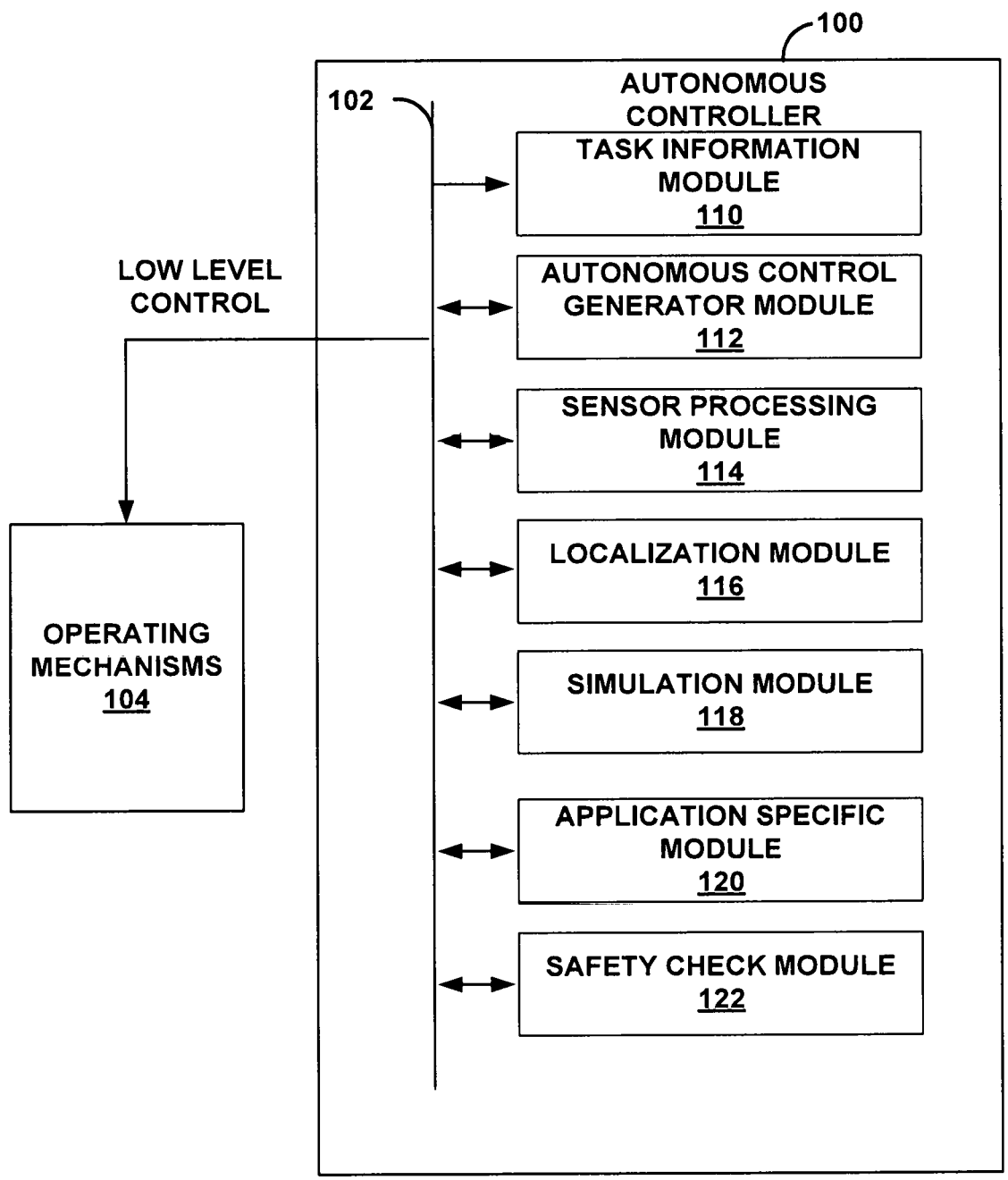
FIG. 1A is a block diagram illustrating an example autonomous controller in accordance with the techniques of the disclosure.

Some control systems may be classified broadly into two distinct categories—autonomous control systems and tele-operated control systems. While some systems with one or the other of these control systems may work adequately in well-structured environments, the performance and utility of these systems is more limited in unstructured and challenging environments, where neither autonomous control nor tele-operated control acting alone is able to provide an adequate solution. As an example, in the area of automotive engineering, while autonomous cars are being developed, and technologies such as cruise control, lane following, and adjusting for speed of other vehicles have been developed, applying these technologies to commercial vehicles such as in trucks in a variety of environments is more challenging. Thus, cruise control and lane following technologies that may work well enough for typical highway driving in cars may not suffice for safe, autonomous control of a truck while it is traveling through streets of a city having significantly less consistent structure. As another example, progress in the area of service robots, and especially for relatively unstructured home environments, has been slow, as the tasks that need to be performed in a home cannot be performed with either autonomous control or tele-operated control alone. Home environments, which often lack relatively consistent structure, are especially challenging for autonomously controlled robots; while fully tele-operated robots may be otherwise unsuitable (e.g. not cost-effective) for many home service tasks. Challenges to fully teleoperation arise from a variety of sources including not having enough data (due to lack of sensors or due to sensor malfunction), latency, cost of operation (due to needing tele-operators) or due to the inability of a human to interpret data. As an example, where the inability of a human to interpret data comes into play, humans tends to react to visual data—thus a location on a map can be comprehend more easily compared to a latitude and longitude. Thus, a camera provides a more easily understood output rather than a sensor that puts out a latitude and longitude however the latter sensor may be better suited for an autonomous controller. These challenges are even more so when the environment is unstructured.

Relying on a system that is either fully autonomous or fully tele-operated may be unsatisfactory for applications that include relatively unstructured environments. Instead, the techniques described herein include mechanisms for selecting an appropriate control paradigm from among multiple control paradigms, or blending of controls to create a new control, based on factors such as the environmental context, characteristics of the robotic system being controlled, and the nature of the task to be performed.

Thus, in some aspects, a control gateway mechanism is described that accepts control from one or multiple controllers such as but not limited to an autonomous controller, a tele-operator controller, and a safety controller and generates a control signal that either is a pass-through control generated by one of the controllers or a combined control generated by combining the controls issued by one or more controllers. The control signals created by the controllers may be informed by the characteristics of the specific robotic system and the environment that robotic system has to operate in. As an example, a service robot may be informed by the structure of a home environment. In another example, control of a commercial vehicle that is operated using the paradigm described above may be informed by the rules of the road as they apply to trucks.

In some aspects, a machine learning algorithm learns the controls that a tele-operator issues in various contexts, and thus over time can reduce the burden of a tele-operator by issuing more autonomous controls.

In some aspects, for widespread adoption of the technology described herein, it is advantageous to reduce or remove the effects of various factors such as but not limited to bandwidth limitations and latency issues.

Numerous benefits may be achieved with the approaches disclosed and described in this document. As an example, for the trucking industry, it may be possible to improve the efficiency of operation by increasing the utilization of trucks. Another benefit may be realized by the truck operators—the strain upon these operators may be reduced. As another example, in the service robot industry, the deployment of robots that can accept various types of controls or generate new controls may find great utility in performing multiple tasks, some of which may be most effectively controlled via the autonomous controller and others that may be more effectively performed via the tele-operated controller.

FIG. 1A is a block diagram illustrating an example autonomous controller 100 in accordance with the techniques of the disclosure. Controller 100 may form part of an agent. Examples of agents include but may not be limited to general purpose robots, specialized robots such as service, industrial, or warehouse robots, private vehicles, on-surface commercial vehicles such as trucks, etc. As illustrated in FIG. 1A, controller 100 may have any number of modules connected to control and data bus 102, such as, but not limited to, for example, task information module 110, autonomous control generator module 112, sensor data processing module 114, localization module 116, simulation module 118, application specific module 120, and safety check module 122. Task information module 110 may include a representation of the task the agent is designed to achieve. Some examples of tasks for the case of a specialized robot include to pick up keys from the floor or to help a person put of a chair. Some examples of tasks for the case of on-surface commercial vehicles include delivering goods from a warehouse in one city to a warehouse in another city. In some examples, tasks may include transitioning a vehicle from above ground to under water.

Autonomous control generator module 112 may accept inputs from a number of modules, may call other modules to perform sections of the computation, and output low-level control that the operating mechanisms of the agent recognizes and acts on. Operating mechanisms 104 may vary widely depending on the agent. If the agent is a robot, operating mechanisms 104 may include the mobile base of the robot or the end-effector of the robot. If the agent is a vehicle, them operating mechanisms 104 may include the steering control, the braking control and the acceleration control. Localization module 116 may accept data from the environment sensors such as global positioning system (GPS) sensors and outputs information about the location of the agent within its environment. Sensor data processing module 114 may accept data from the environmental sensors, or sensors that provide information about the environment of the agent, and outputs processed data that may include obstacle maps or information about how heavy a load the robot is being asked to pick.

Simulator module 118 may be called upon within the computations of the autonomous control generator module to perform simulations to determine how best to achieve a task. That is, for example, simulator module 118 may be configured to perform a series of a simulations to determine a set of low-level controls that best achieves a high-level task of the one or more high-level tasks by simulating commands produced by the set of low-level controls and determining whether the simulated commands produced by the set of low-level controls achieves a threshold of success. As an example, if the agent is a service robot, and the task is to pick up an object from the floor then simulation module 118 may perform simulations as to the least time-consuming ways to maneuver the base and the arms or other moveable members of such a robot to reach the object and pick up the object. Application specific module 120 may be called upon by simulation module 118 and may contain information about the rules that are prevalent in the environment of the agent. As an example, for the service robot example above, application specific module 120 may contain information about the type of floors used in that specific environment. Safety check module 122 may perform a final check on the commands produced by the autonomous controller before applying the low-level signals produced by autonomous control generator module 112 to operating mechanisms 104 of the agent. As an example, safety check module 122 may ensure that the service robot does not move more than a few centimeters in a house.

As another example, the agent may be a mobile industrial robot or mobile warehouse robot, which may be responsible for identifying objects, picking up objects at a first location, and delivering and setting down the objects at a second location. Simulation module 118 may perform simulations as to the least time-consuming ways to maneuver the base and the arms or other moveable members of such a robot to reach the object and pick up the object. Application specific module 120 may be called upon by simulation module 118 and may contain information about the rules that are prevalent in the environment of the agent. Application specific module 120 may contain information about the type of floors used in that specific environment. Safety check module 122 may perform a final check on the commands produced by the autonomous controller before applying the low-level signals produced by autonomous control generator module 112 to operating mechanisms 104 of the agent. As an example, safety check module 122 may ensure that the agent does not move more than a few centimeters in a warehouse or factor.

Figure 1B:
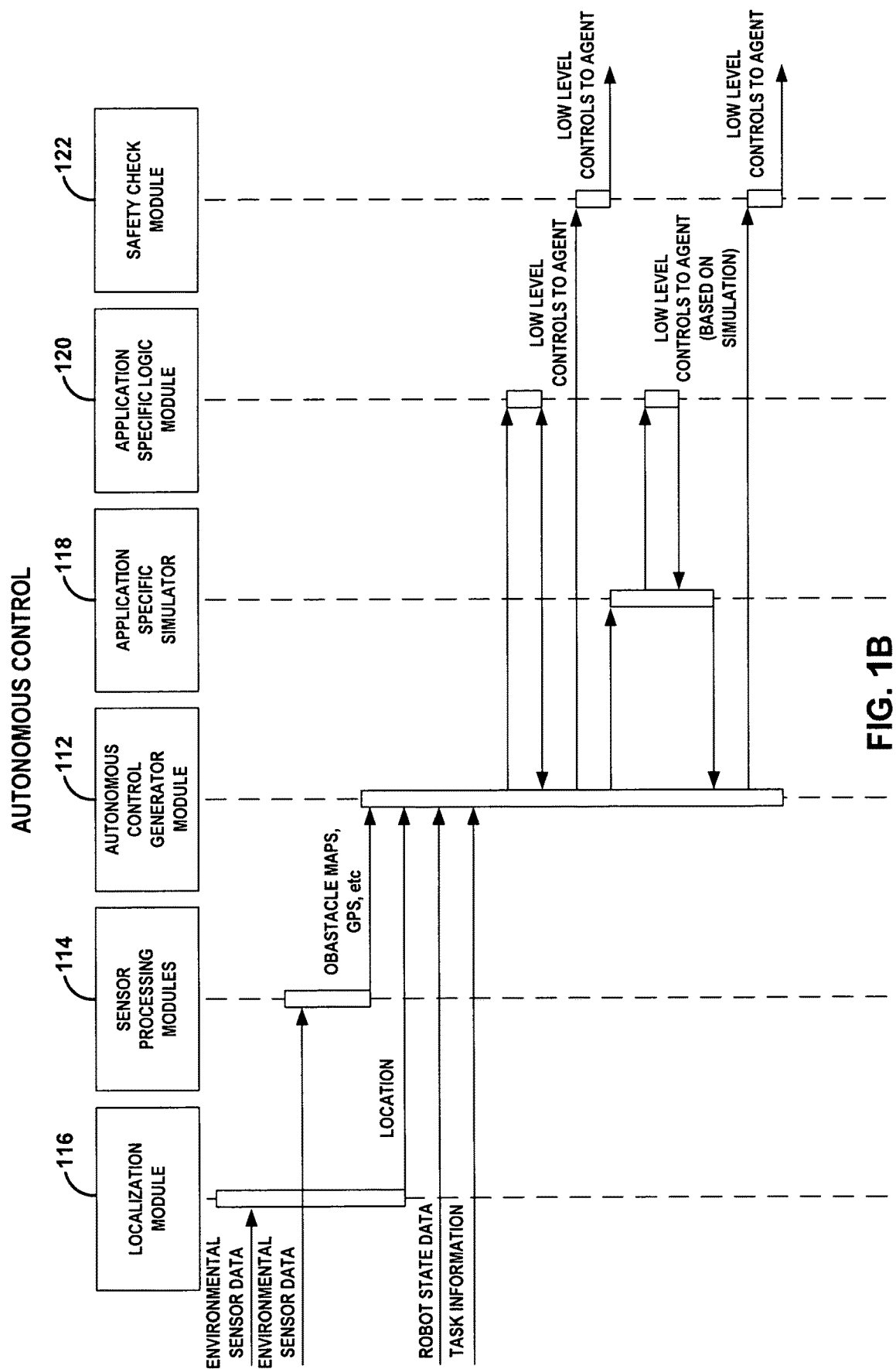
FIG. 1B is a conceptual diagram illustrating an example operation of the autonomous controller of FIG. 1A in accordance with the techniques of the disclosure.

FIG. 1B illustrates a sequence diagram of how modules 110-122 may work together. From the left, localization module 116 accepts data from the environmental sensors and produces location data. Sensor data processing modules 114 accepts data from the environmental sensors and produces information such as obstacle maps. Autonomous control generator module 112 accepts the location data, the processed data from the sensors, task information, the agent state data from sensors that may be installed within the agent to provide information about the operating mechanisms of the agent. With these inputs, autonomous control generator module 112 may perform some computations and produce low-level signals that may be issued to safety check module 122.

Safety check module 122 in turn performs safety checks and issues the controls to the operating mechanisms of the agent. If the agent is a vehicle, an example of such a control is to turn on the signal indicators when the vehicle is about to turn. Some other computations performed by autonomous control generator module 112 may involve calling simulation module 118 that may in turn call application specific module 120. As explained earlier, modules 118 and 120 may be called upon when there are multiple ways of performing a specific task and the controller is instructed to find the specific method specified by priori programming. As an example, autonomous control generator module 112 may be instructed to find the fastest method to perform a task. Autonomous control generator module 112 may also be instructed to achieve multiple goals such as the fastest method but not faster that a predetermined value.

Figure 2A:
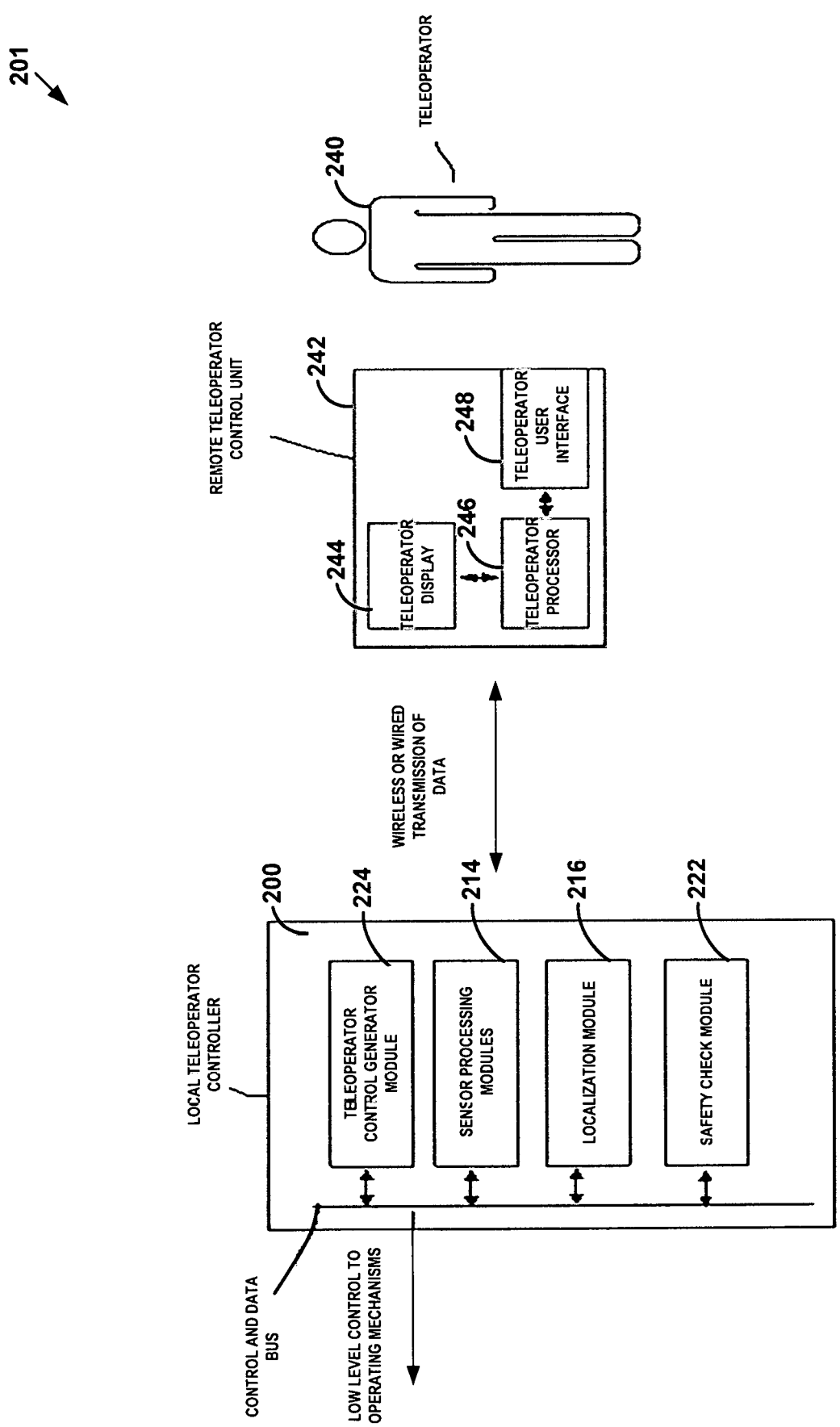
FIG. 2A is a block diagram illustrating an example tele-controller in accordance with the techniques of the disclosure.
Figure 2B:
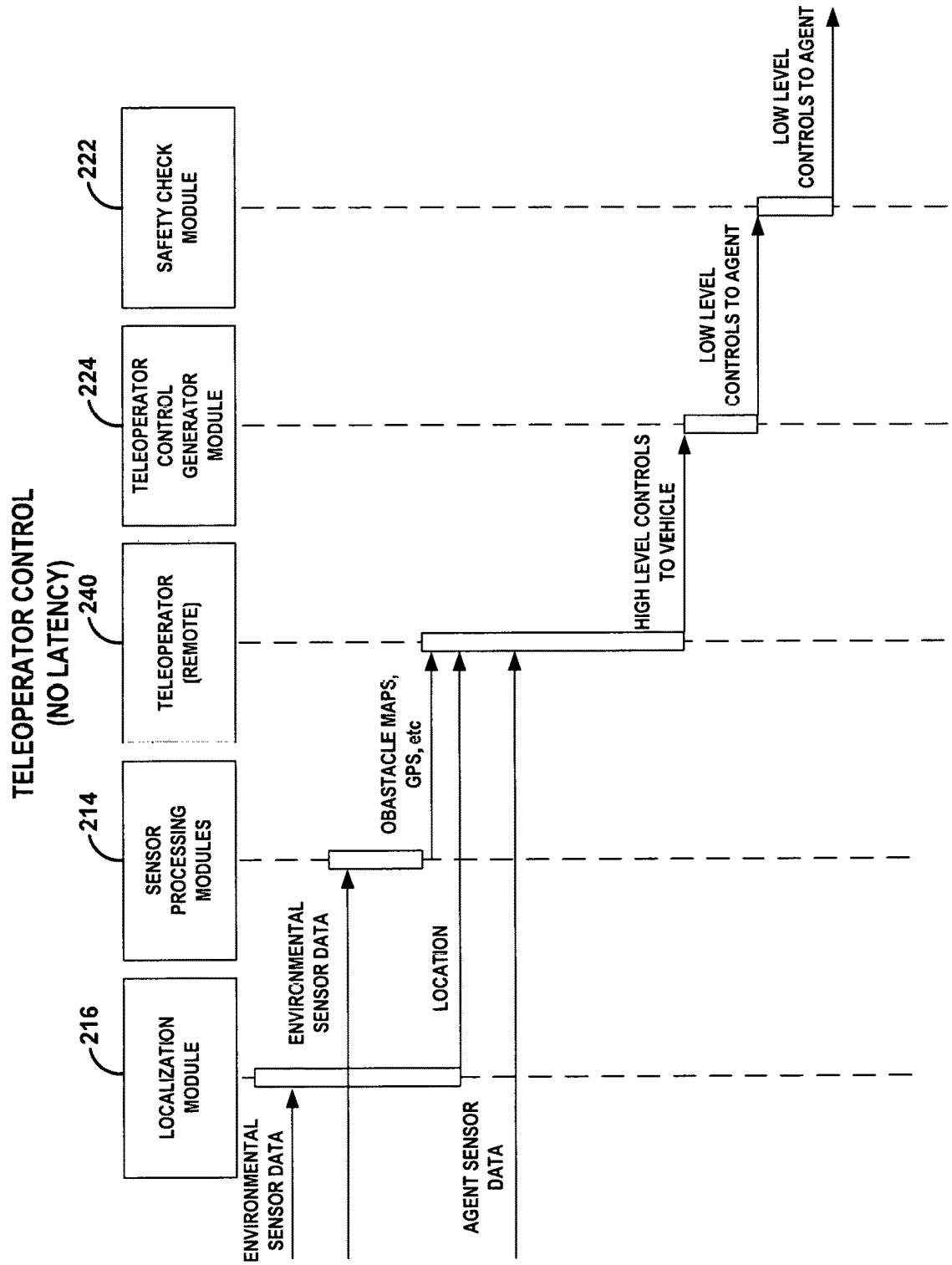
FIG. 2B is a conceptual diagram illustrating an example operation of the tele-controller of FIG. 2A in accordance with the techniques of the disclosure.

FIGS. 2A and 2B describe one implementation of a tele-operator controller 200. Tele-operator system 201 may include a tele-operator controller 200, remote tele-operator control unit 242, and tele-operator 240. FIG. 2A shows many of the same modules as illustrated for autonomous controller 100 of FIGS. 1A and 1B. The function of these modules is largely the same as for autonomous controller 100. For example, sensor data processing module 214 may be similar to sensor data processing module 114, localization module 216 may be similar to localization module 116, and safety check module 222 may be similar to safety check module 122.

Tele-operator control generator module 224 may accept high-level controls from remote tele-operator 240 and convert these into low-level controls. Remote tele-operator control unit 242 may include tele-operator display 244, tele-operator processor 446, and tele-operator user interface 248. Tele-operator display 244 may display information such as but not limited to the information about the immediate environment of the agent and information about the status of the operating systems of the agent. Tele-operator processor 246 provides a computing environment where computations such as but not limited to converting the tele-operator's input into high-level commands may be accomplished. Tele-operator user interface 248 is the way in which a tele-operator provides input. Information such as but not limited to control data and sensor data may be transferred back and forth between the local controller and the remote control unit.

FIG. 2B illustrates a sequence diagram for tele-operator system 201. In comparison to FIG. 1B, in tele-operator system 201, because human tele-operator 240 may be present, application specific simulation and application specific logic module may be omitted as the human may make decisions based on experience. However, in some aspects described below, application specific simulation and application specific logic module may be included and provide benefits to the human. However, for the configuration illustrated in FIG. 2B, remote tele-operator 240 may issue a high-level command that is input to tele-operator control generator module 224 located within the agent. Subsequently, tele-operator control generator module 224 converts the high-level control to a low-level control that then goes through a safety check before being applied to the operating mechanisms of the agent. Thus, with this configuration, tele-operator 240 may control a variety of agents such as but not limited to robots, vehicles, etc.

In many situations having only one of tele-operated control or an autonomous control may be insufficient. Accordingly in some examples, an advanced control management mechanism is provided that enables selective control through one or multiple paradigms or through the creation of a hybrid control that combines one or multiple controls.

Figure 3A:
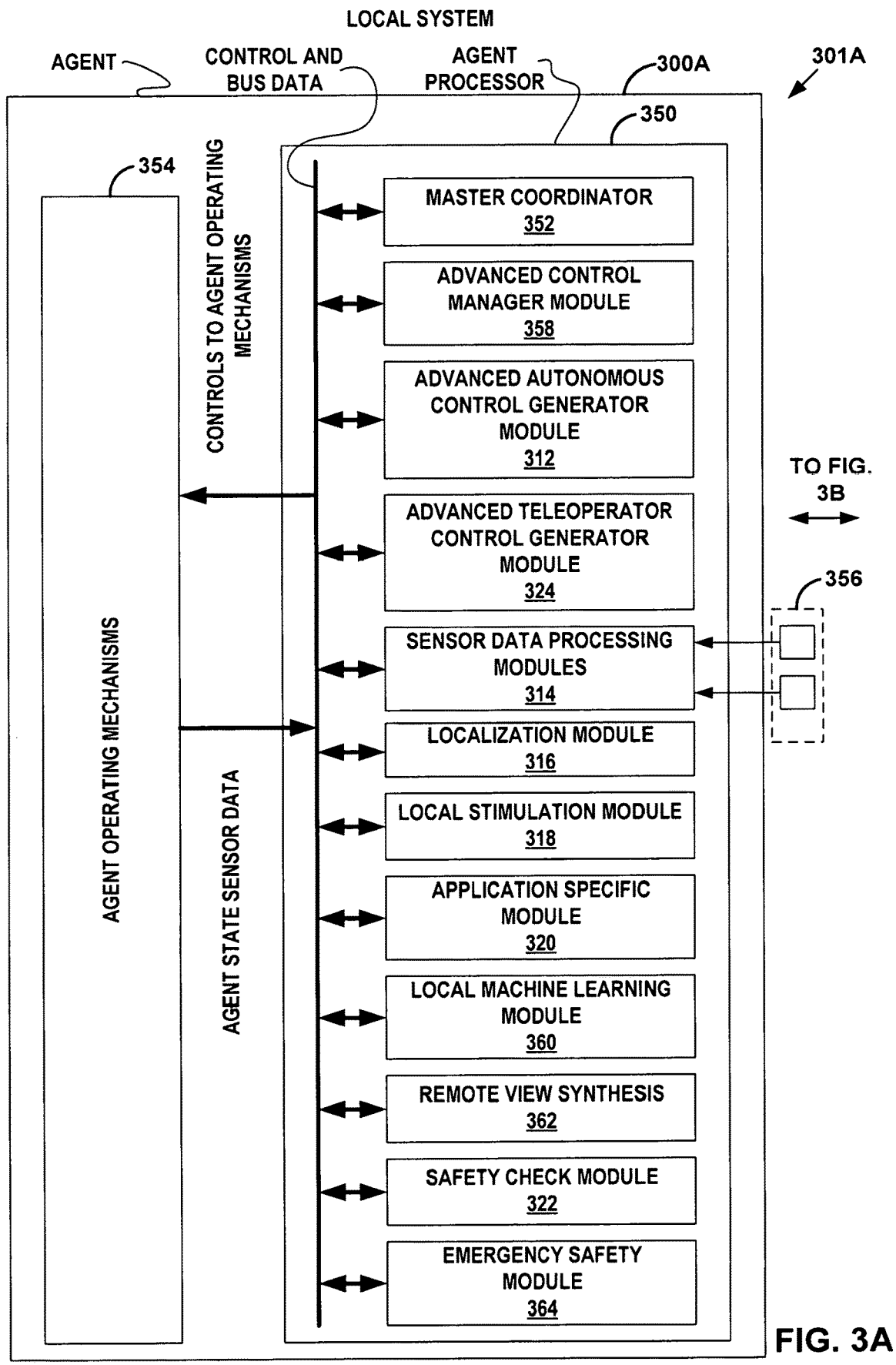
FIG. 3A is a first block diagram illustrating an example hybrid control system in accordance with the techniques of the disclosure.

FIG. 3A illustrates advanced control system 301A and provides a functional block diagram of local agent system 301A such as, but not limited to: a robot, a private vehicle, an on-surface commercial vehicle, or a UAV/drone that utilizes such a mechanism. In FIG. 3A, control agent 300A (also referred to as simply "agent 300A") is shown to include agent processor 350 that further includes (or is programmed to include) the advanced control mechanism, shown in FIG. 3A as the advanced control manager module 358. The functioning of advanced control manager module 358 is described within the context of the agent that utilizes this module. Additional aspects that are illustrated in FIG. 3A will also be described in detail below.

Agent 300A may include a number of modules. Three groups of modules that are illustrated in FIG. 3A, may include agent processor 350, the agent operating mechanisms 354, and agent environmental sensors 356. Agent processor 350 provides a computing environment whose functions may include data processing and control generation and handling, including the advanced control mechanism.

Various illustrative modules within agent processor 350 are described further below. Agent operating mechanisms 354 may be responsible for the functions that agent 300A performs. In the case of a robot, for example, these mechanisms may include (without limitation): conventional motors, gears, transmissions, end-effectors, mobile base etc. In the case of a vehicle, these mechanisms may include (without limitation): conventional steering mechanisms, braking mechanisms, gear shifting mechanisms, electrical subsystem, etc. Agent environmental sensors 356 (e.g., cameras, LIDAR, etc.) provide information to agent processor 350 regarding the environment of agent 300A. For example, if agent 300A is a service robot, agent environmental sensors 356 may provide information about obstacles in a room. Similarly, if agent 300A is a surface vehicle, agent environmental sensors 356 may provide information about the road and other vehicles around the vehicle.

Agent processor 350 may include master coordinator 352, advanced control manager module 358, advanced autonomous control generator module 312, advanced tele-operator control generator module 324, sensor data processing module 314, localization module 316, application specific module 318, application specific module 320, local machine learning module 360, remote view synthesis module 362, safety check module 322, and emergency safety module 364. For example, advance autonomous control generator module 312 may perform one or more functions of autonomous control generator module 112, sensor data processing module 314 may be similar to sensor data processing module 114, localization module 316 may be similar to localization module 116, local simulation module 318 may be similar to simulation module 118, application specific module 320 may be similar to application specific module 120, and safety check module 322 may be similar to safety check module 122.

Figure 3B:
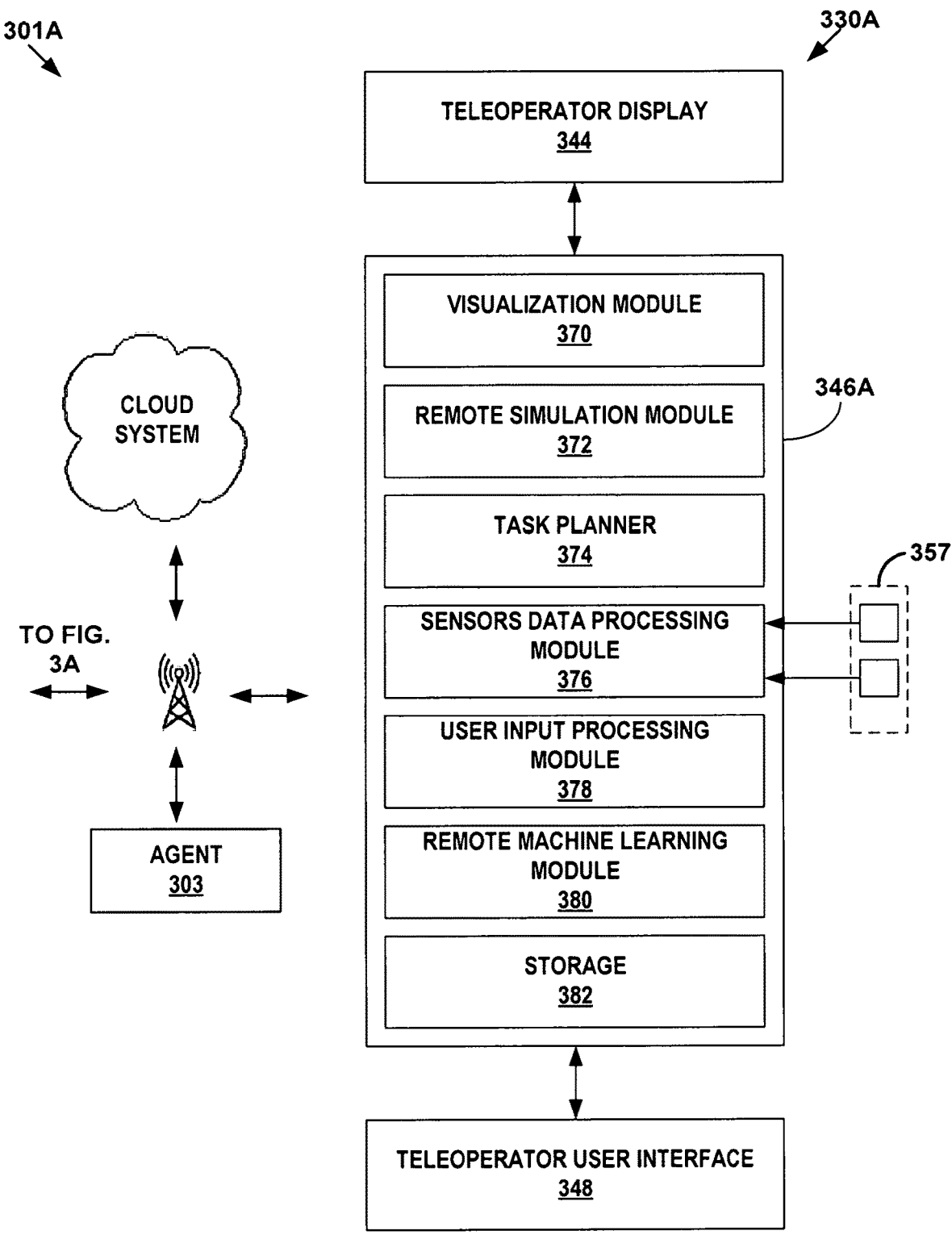
FIG. 3B is a second block diagram illustrating the example hybrid control system of FIG. 3A in accordance with the techniques of the disclosure.

FIG. 3B illustrates remote tele-operator control unit (TCU) 330A (also referred to herein as a control engine) that may be operated by a tele-operator. The tele-operator control unit 330A may include a number of modules. Four groups of modules are illustrated in FIG. 3B include tele-operator display 344, tele-operator processor 346A, tele-operator control unit (TCU) sensors 357, and tele-operator user interface 348. Data and control signals between tele-operator control unit 330A and agent 300A may be transferred back and forth using various methods including (but not limited to) wirelessly. Tele-operator processor 346A may include visualization module 370, remote simulation module 372, task planner 374, sensor data processing module 376, user input processing module 378, remote machine learning module 380, and storage 382.

As shown in FIG. 3B, control system 301A may include another agent, for instance, but not limited to, agent 303. In some examples, control system 301A may include more than two agents. Agent 300A may output a dynamically changed master plan to an external system such that the dynamically changed master plan can subsequently be used by another agent. For instance, agent 300A may output a dynamically changed master plan to agent 303 such that the dynamically changed master plan can subsequently be used by agent 303. In some examples, agent 300A may receive a master plan from another system. For instance, agent 300A may receive a master plan from agent 303.

Figure 3C:
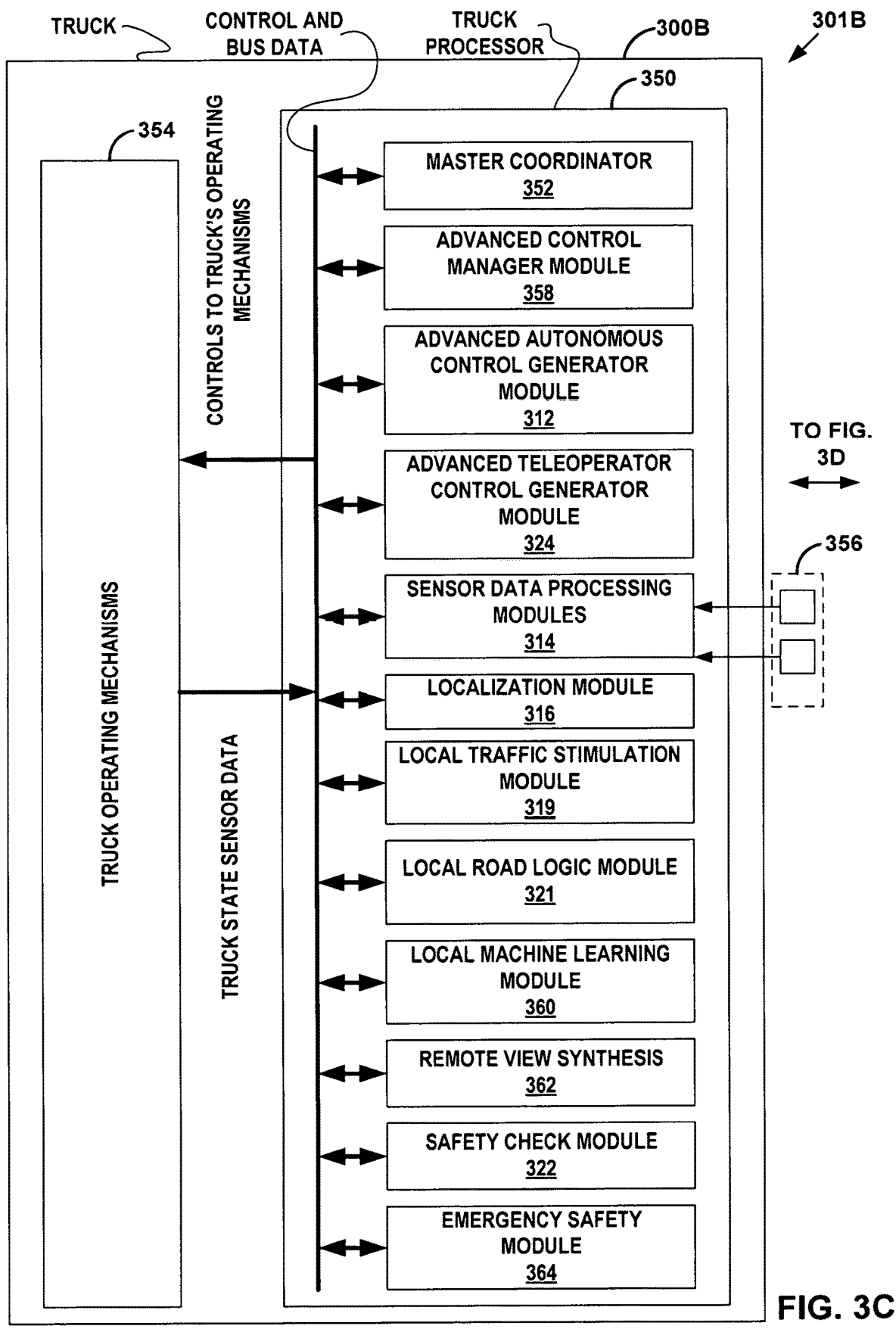
FIG. 3C is a first block diagram illustrating an example hybrid control system for a truck in accordance with the techniques of the disclosure.

FIG. 3C illustrates a specific example advanced control system 301B where agent 300B is a truck. Accordingly, some modules illustrated in FIG. 3C are different in relation to the corresponding modules utilized in FIG. 3A, to reflect the needs of a truck application. In particular, simulation module 318 of FIG. 3A is replaced in FIG. 3C by local traffic simulation module 319 and application specific module 320 is replaced by road logic module 321.

Figure 3D:
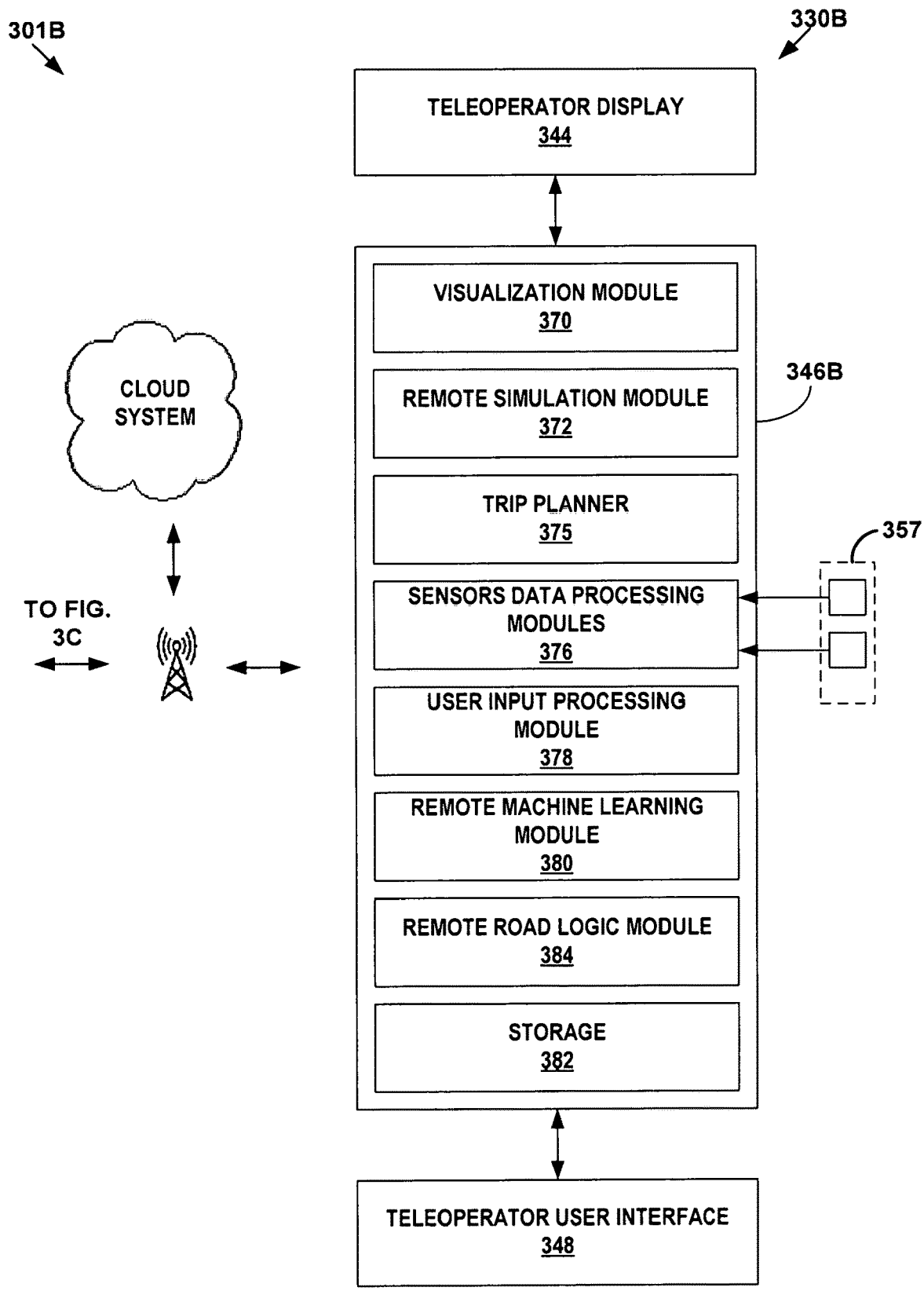
FIG. 3D is a second block diagram illustrating the example hybrid control system for the truck of FIG. 3C in accordance with the techniques of the disclosure.

FIG. 3D illustrates further details of the specific example advanced control system 301B where agent 300B is a truck. On tele-operator control unit 330B, task planner 374 is replaced by trip planner module 375 and remote road logic module 384 is added. Also, even where the corresponding modules between FIGS. 3A and 3C share the same name and have the same general functionality, the particulars of the functionality may differ depending on what the agent is tasked to do. This will more fully described below. With the advanced control system disclosed herein, a truck may be driven utilizing one or multiple paradigms—it may be driven autonomously, or in a tele-operated manner, or in a hybrid mode as explained further below.

Local Agent System Master Coordinator

Master coordinator 352 coordinates the functioning of the various modules of the local control system. One function of master coordinator 352 is to orchestrate the sequencing of the modules. In some examples of the advanced control system disclosed herein, where multiple control paradigms are possible, another function of master coordinator 352 may be to orchestrate which control paradigm to apply at any instant. Thus, in some aspects of the approach, master coordinator 352 includes a mechanism that enables this orchestration of control paradigm(s), which may be implemented in several ways. (For ease of illustration, the present disclosure describes a single master coordinator module as being responsible for orchestration of module sequencing and of control paradigm selection. However this is not essential to the approach; separate coordinator modules may be implemented for each respective orchestration function, as practitioners will readily appreciate.)

In some example implementations, a master plan for control paradigm selection may be created at the tele-operator control unit within the tele-operator processor. As illustrated in FIG. 3B, tele-operator processor 346A includes remote simulation module 372. The (e.g., human) tele-operator may enter information, including but not limited to information about the task that needs to be performed and about the environment that agent 300A is expected to work in, through tele-operator user interface 348. Tele-operator processor 346A may receive such information provided by the tele-operator, and/or obtain other information already stored within it or obtain such information through external services and provide such information to remote simulation module 372. Examples of information that may already be stored within the processor may include (without limitation) the abilities of agent 300A (e.g. the agent can only lift objects weighing less than 2 lb). Examples of information obtained through external services may include (without limitation) map services and road conditions, if the agent is a vehicle such as a truck. With this information, simulation tool may perform simulations to determine an appropriate control paradigm. Remote simulation module 372 may perform these simulations based on knowledge about the capabilities/limitations of the agent and knowledge about the difficulty of the task.

Knowledge regarding difficulty of a given task may be pre-programmed within remote simulation module 372, and/or may also be obtained over time through machine learning module 380 as described below. Remote simulation module 372 may call upon task planner 374 to segment the input task into a list of sub-tasks, where a sub-task refers to a unit of action within a larger task. Although not shown in FIGS. 3A-3B, task planner 374 may also be implemented within agent 300A.

Figure 4A:
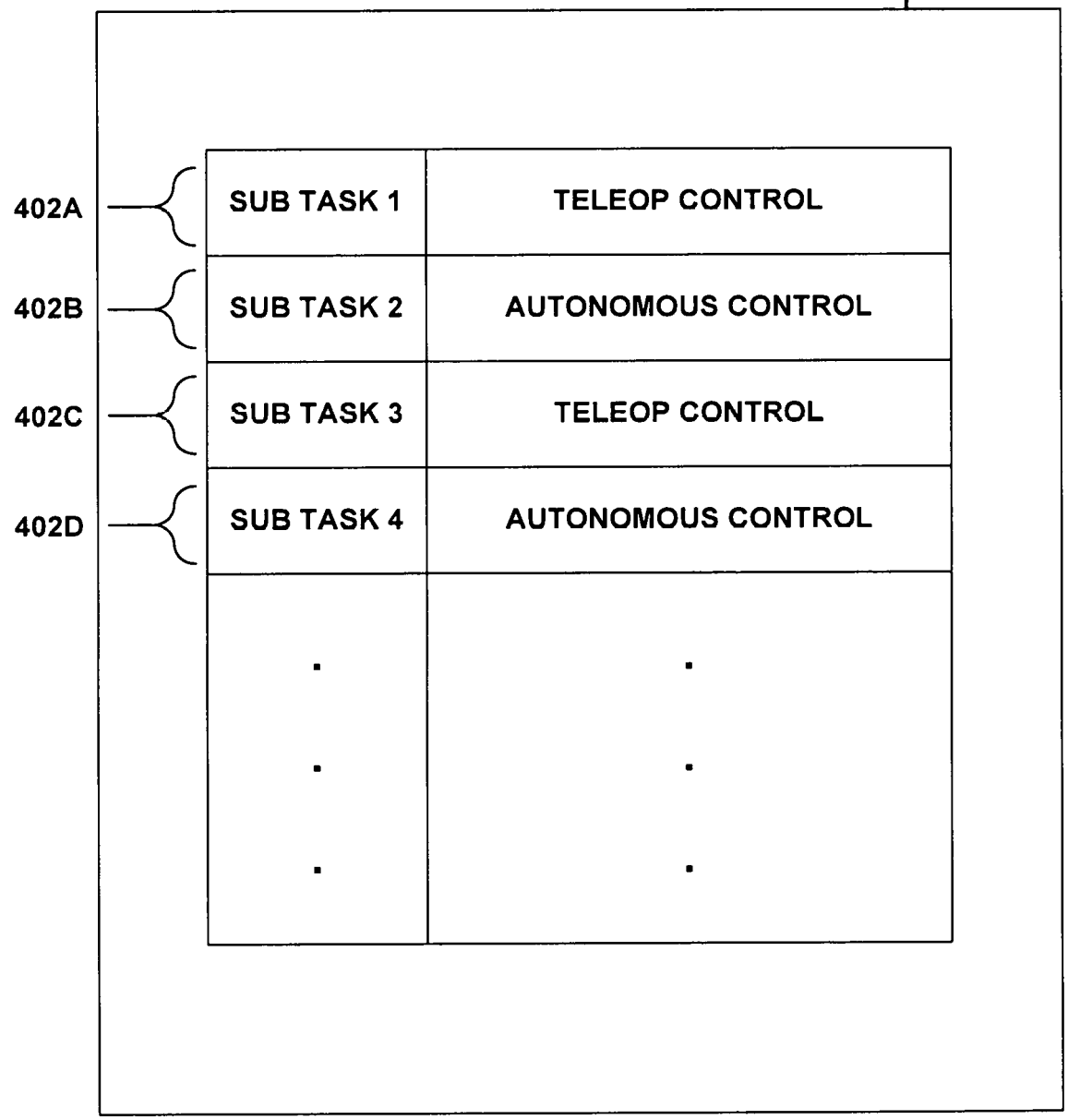
FIG. 4A is a table illustrating an example master plan for an agent in accordance with the techniques of the disclosure.
Figure 4B:
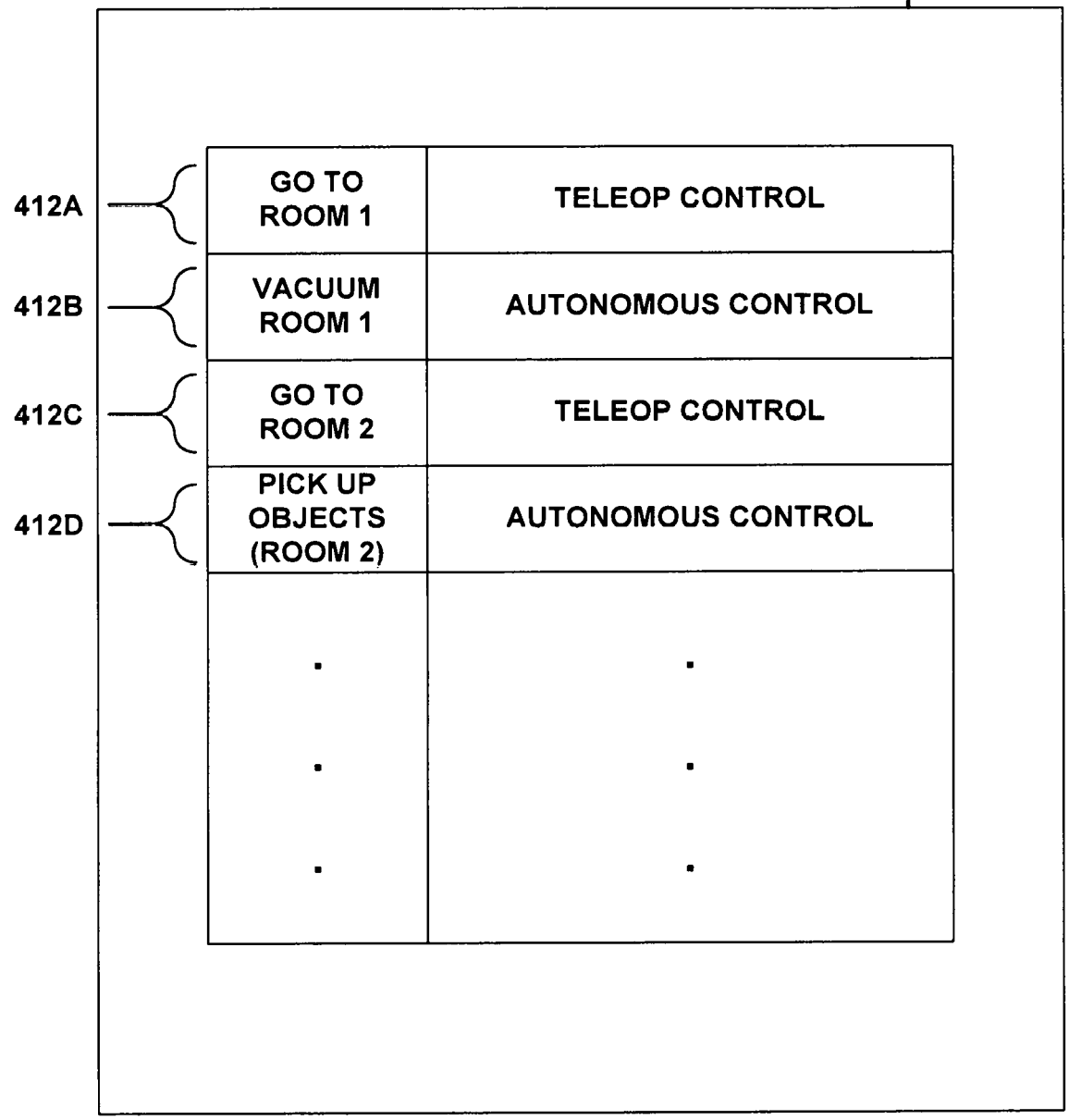
FIG. 4B is a table illustrating an example master plan for a service robot in accordance with the techniques of the disclosure.

When the simulation is complete, remote simulation module 372 may create table 400A illustrated in FIG. 4A. Table 400A may include a number of sub-tasks 402A-402D (collectively, sub-tasks 402) along with a suggested control paradigm based on the simulation. As shown, a low-level control obtained for high-level task 402A is received from "Teleop control" or a tele-operator. For instance, low-level control obtained for high-level task 402A may be obtained by advanced teleoperator control generator module 324 using outputs from TCU 330A, which are based on an input from a teleoperator. In the example of FIG. 4B, a low-level control obtained for high-level task 402B is autonomously determined. For instance, low-level control obtained for high-level task 402B may be determined by advanced autonomous control generator module 312. In this way, master coordinator 352 may transition between one or more remotely initiated high-level tasks (e.g., high-level task 402A) and one or more locally initiated high-level tasks (e.g., high-level task 402B).

For an example service robot application, remote simulation module 372 may create table 400B illustrated in FIG. 4B, which includes at least a number of sub-tasks 412A-

412D. In FIG. 4B, first sub task 412A, going to room 1, is associated by the master plan table with tele-operator control. This may be a reasonable control paradigm selection if, for example, navigating inside a home environment is relatively challenging and is not easily accomplished by an autonomous system. Remote simulation module 372 may contain (e.g. via pre-programming or machine learning, as noted above) the knowledge about the level of difficulty of navigating in a home environment. Thus, when remote simulation module 372 encounters sub-task 412A, remote simulation module 372 may determine to assign the tele-operator control paradigm to sub-task 412A. Second sub task 412B is to vacuum room 1. Sub task 412B may be assigned the autonomous control paradigm. Sub task 412C is to go to room 2, and like sub task 412A is also assigned tele-operator control. Finally, in room 2, sub task 412D of picking up objects is assigned tele-operator control. As noted before, these example assignments may reflect the level of difficulty of each sub-task that is known by remote simulation module 372, e.g. via learning or pre-programming by machine learning module 380.

FIG. 4C illustrates how table 400C may be configured for a truck. In FIG. 4C, the trip information may be entered by the remote tele-operator. A trip planner in this case (e.g., FIGS. 3C-3D) may segment the trip into multiple smaller trip segments 422A-422E (collectively, segments 422), where each trip segment may be uniquely identified by a location. Based on the knowledge about the location of each trip segment of segments 422 and the road conditions at that location (which may be obtained e.g. through external, conventional map services), remote simulation module 372 may create table 400C and associate a control paradigm to each segment of segments 422.

As an example, if a trip segment of segments 422 is on a relatively straight road such as a highway, autonomous control may be appropriate. If a trip segment of segments 422 is inside a city, on roads with less consistent structure, tele-operation control may be appropriate. Thus table 400C, which may be dynamically updated based on local conditions experienced by the truck when the trip commences, and/or based on updated maps created by other similarly equipped trucks that have previously traveled this segment, creates a master plan for execution of the trip. Table 400C also enables tele-operator controller 346B to be ready to issue controls when such controls are needed. Features of the approach herein related to how hand-offs between different control paradigms can be smoothly managed, and how the table is dynamically updated, will be described later.

Once table 400C specifying the master plan is created, remote simulation module 372 may send table 400C to master coordinator 352 on the local system. Subsequently master coordinator 352 may use table 400C for a sequencing function of master coordinator 352, initiating the execution of modules as necessary. Master coordinator 352 may also use table 400C to coordinate hand-offs between control paradigms and to provide messages to the tele-operator. As noted, this will be described in later sections.

In variations of the aspects described above, the master plan may be created by the modules within the local system, or within a cloud based system that will be described later.

Advanced Autonomous Control Generator Module

Figure 5A:
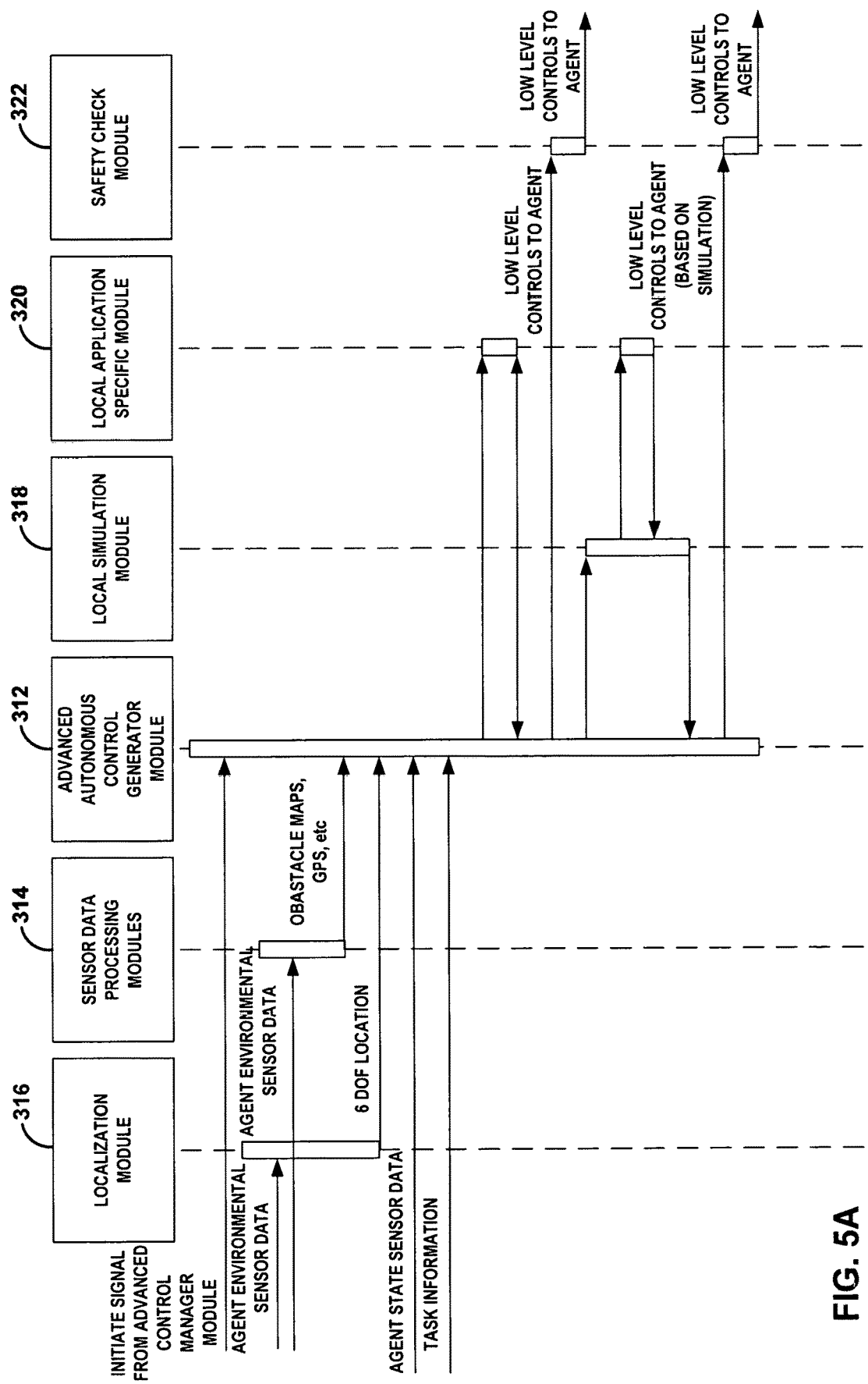
FIG. 5A is a conceptual diagram illustrating an example operation of a hybrid control system for an agent while operating autonomously in accordance with the techniques of the disclosure.

An advanced autonomous control generator module is now described with the help of FIG. 5A. In the configuration illustrated in FIG. 5A, advanced autonomous control generator module 312 accepts multiple inputs. The inputs illustrated in FIG. 5A are an initiate signal from advanced control manager module 358, the output of localization module 316 and sensor data processing module 314, the agent state sensor data and task information. Some inputs may be referred to as context for agent 300A. Examples of context for an agent for may include, but are not limited to, a geolocation of the control agent, a state of the control agent, scene understanding including an uncertainty in the scene where the scene understanding comprising the control agent, an environmental condition, communication conditions, an operator experience, or an operator state. Configurations having more or fewer inputs, or inputs that provide different information, are also possible and are consistent with the approach disclosed herein.

Advanced control manager module 358 provides a signal to advanced autonomous control generator module 312 indicating that for the specific task (or sub-task) indicated in the task information input, advanced autonomous control generator module 312 is responsible for producing the low-level control that drives operations of the agent. Master coordinator 352 provides the task information input based on the master plan. Said differently, for example, task planner 374 installs a master plan. In this example, master coordinator 352 provides the task information input based on the installed master plan.

Once this signal is processed by advanced autonomous control generator module 312, advanced autonomous control generator module 312 proceeds to invoke other modules, such as local simulation module 318. These other modules may in turn invoke still other modules. Said differently, for example, advanced autonomous control generator module 312 may operate agent 300A according to the master plan to, for each high-level task of the high-level tasks, obtain one or more low-level controls and to direct agent 300A to perform the one or more low-level controls to realize the high-level task.

In FIG. 5A, for example, local simulation module 318 invokes local application specific module 320. In this example, advanced autonomous control generator module 312 may operate agent 300A according to the master plan to transition between the plurality of high-level tasks, based at least on a context for agent 300A, to cause agent 300A to operate at least partially autonomously and at least partially based on input from the tele-operator during execution of the master plan. For instance, as shown in FIG. 3A, based on information from the various invoked modules, advanced autonomous control generator module 312 generates the final control signals, which are then sent to safety check module 322 that performs safety checks and applies the low-level controls to the operating mechanisms of the agent. In this example, advanced autonomous control generator module 312 may operate according to the master plan to transition between the plurality of high-level tasks, based at least on a context for agent 300A, to operate at least partially autonomously and at least partially based on input from the tele-operator during execution of the master plan. In some examples, advanced autonomous control generator module 312 may dynamically adjust the master plan for a high-level task from the installed master plan based on the context. For instance, advanced autonomous control generator module 312 may trigger back to operating at least partially based on input from the tele-operator due to one or more of a safety environment of agent 300A or an uncertainty of a scene comprising agent 300A.

For the example of the service robot for sub-task 412B (e.g., vacuum room 1—in FIG. 4B), initially, advanced control manager module 358 may instruct advanced autonomous control generator module 312 that advanced control manager module 358 (e.g., the autonomous controller) is now responsible for operating the robot. Advanced autonomous control generator module 312 may accept additional inputs from localization module 316 that may provide information about which room the robot is located in. Sensor data processing module 314 may provide obstacle maps based on environmental sensors 356 installed on the robot. Other input information may include information about the operating mechanisms of the service robot and task information from task planner 374. With this information, advanced autonomous control generator module 312 may call upon other modules such as local simulation module 318, to execute the task. In this case, local simulation module 318 may have the information about the room and may find the pathway through the room that cleans the room in the most time efficient manner, given the objects within the room. For this particular sub-task, it may not be necessary to initiate safety check module 322. FIG. 5A illustrates the sequence diagram and includes safety check module 322 which is optional for this application but may be initiated for other applications.

Figure 5B:
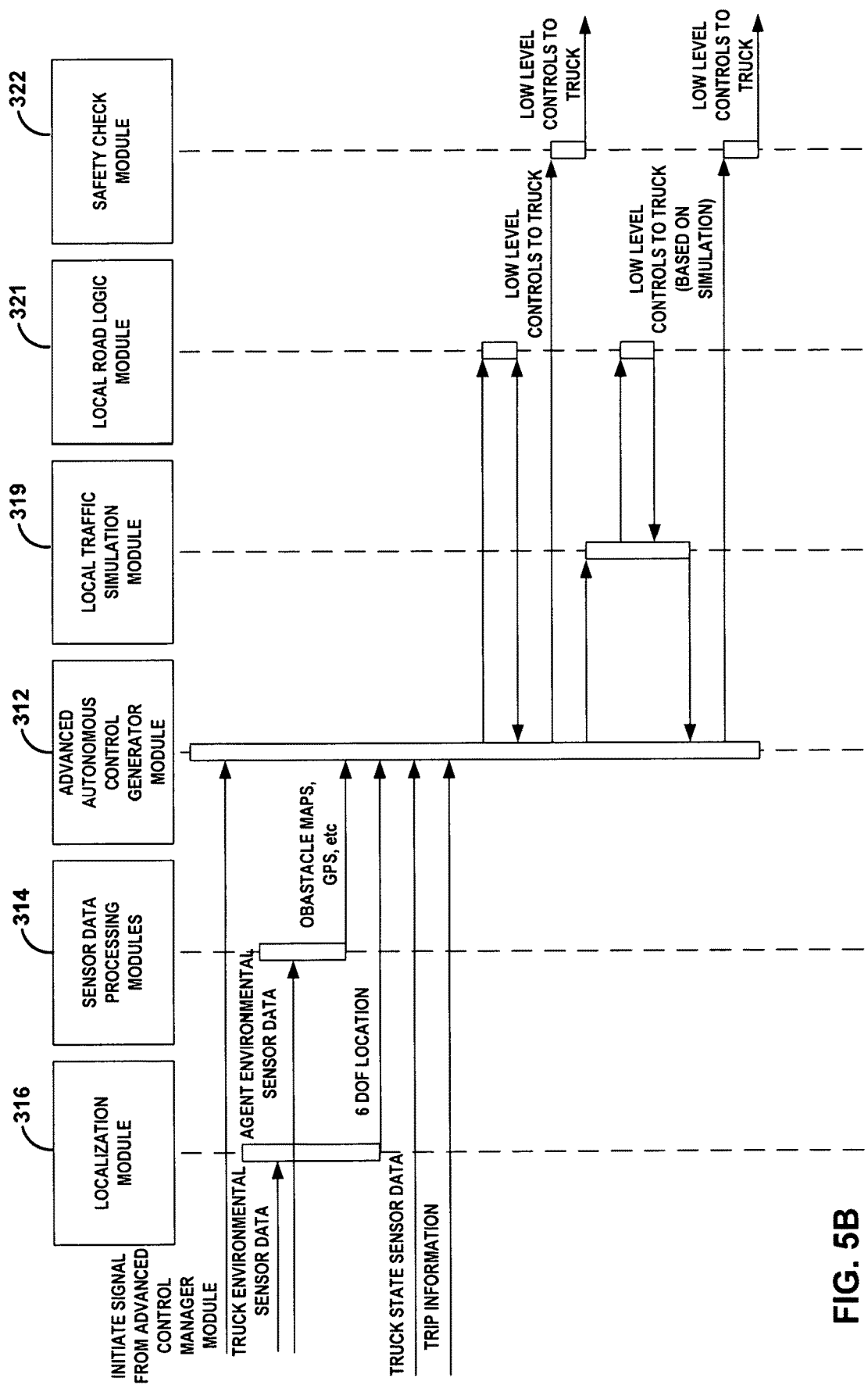
FIG. 5B is a conceptual diagram illustrating an example operation of a hybrid control system for a truck while operating autonomously in accordance with the techniques of the disclosure.

FIG. 5B illustrates the sequence diagram for a truck. In this application, advanced control manager module 358 may instruct advanced autonomous control generator module 312 that advanced control manager module 358 (e.g., the autonomous controller) is now responsible for operating the truck. The sensor data corresponds to the data generated by the sensors installed on the truck. In addition, sensors installed in the operating mechanisms of the truck may generate the truck state sensor data. Local traffic simulation module 319 may simulate various scenarios and provide the best path for the truck to follow. Local road logic module 321 may provide information about the rules and other information about the road and the objects such as but not limited to other vehicles and people in the vicinity of the truck. Safety check module 322 initiates a safety check on the low-level controls generated by advanced autonomous control generator module 312 before applying the controls to the operating mechanisms of the truck. Local traffic simulation module 319 may take into account some additional considerations related to the truck and the sensors that may be placed around the truck. This will be explained in sections below.

In an additional feature that may be beneficial broadly across many applications, autonomous control generator module 312 may be structured to accept different levels of command from the tele-operator control unit. Levels of control may be defined by how closely the controls resemble the machine language used to communicate controls to the operating systems. At the lowest level, the control can be issued directly to the operating mechanisms of the agent. At the highest level, a command can be issued in a high-level programming language which is subsequently interpreted and converted into a low-level command. The flexibility of being able to use different levels to communicate with the autonomous control generator may be beneficial as it subsequently provides multiple ways for a tele-operator to communicate to the autonomous generator as well.

Tele-Operator Control

Figure 6A:
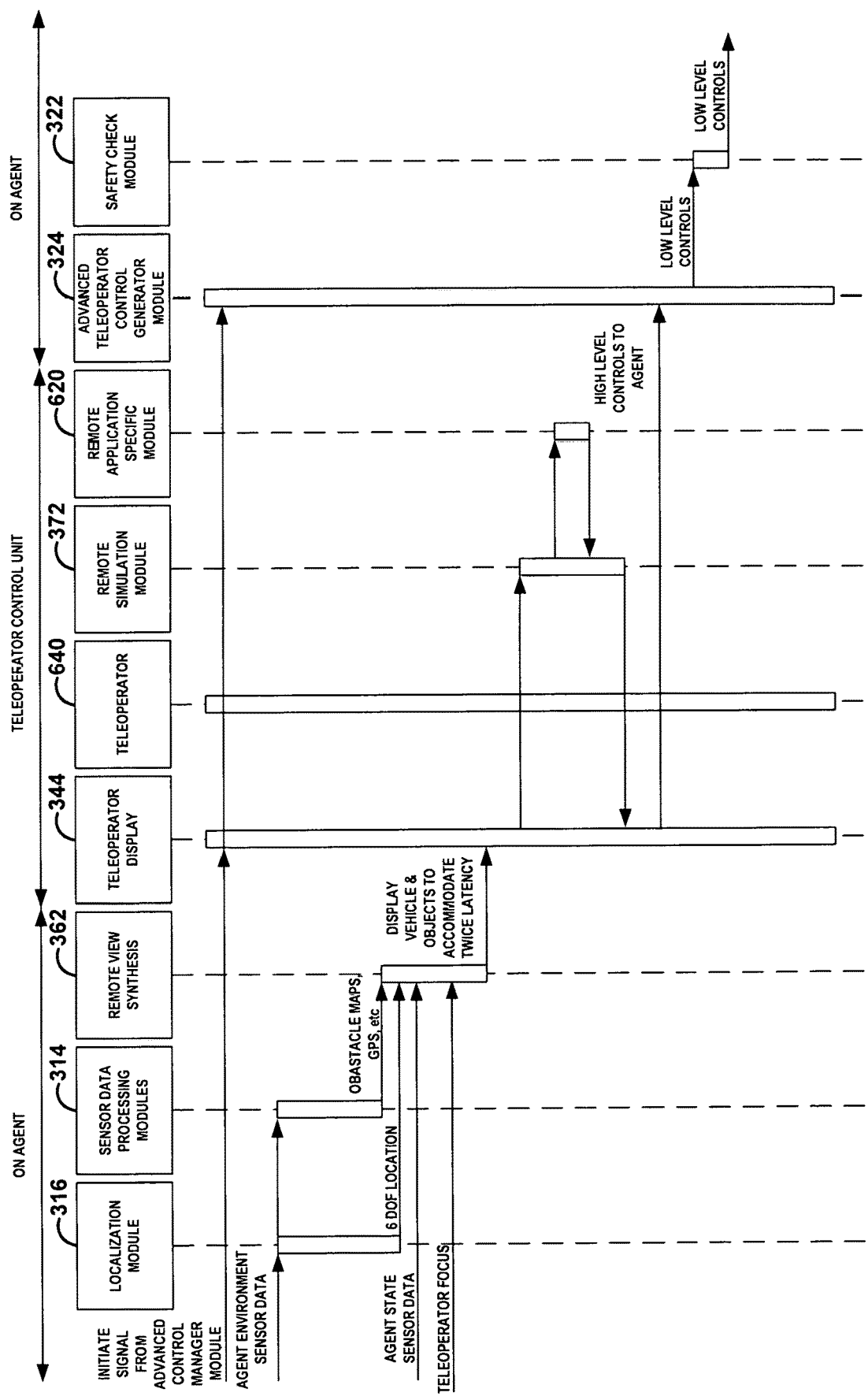
FIG. 6A is a conceptual diagram illustrating an example operation of a hybrid control system for an agent while operating based on tele-control in accordance with the techniques of the disclosure.

An advanced tele-operator control mechanism is now described with the help of FIG. 6A. In FIG. 6A, advanced control manager module 358 sends a signal to advanced tele-operator control generator module 324 and to the tele-operator display 344, indicating that the teleoperation mode is now responsible for operating the agent. Advanced tele-operator control generator module 324 may perform one or more functions similar to advance autonomous control generator module 312. Based on this indication, tele-operator 640 (e.g., a human being) may issue controls.

Tele-operator 640 may choose to initiate simulations by remote simulation module 372, the results of which may be used as an aid in deciding the specific control. As an example, if the agent is a service robot, for the task of pickup up a complex object, tele-operator 640 may cause remote simulation module 372 to run simulations to decide which type of end-effector to use and how to approach the object to obtain a successful grip. Tele-operator 640 may interact with user input processing module 378 to generate control signals, which may be sent to advanced autonomous control generator module 312 located within the agent. Advanced tele-operator control generator module 324 may also receive a signal from advanced autonomous control generator module 312, indicating that advanced autonomous control generator module 312 can pass the signal (from advanced tele-operator control generator module 324) onward to be applied to the operating mechanisms of the agent. Safety check module 322 may be also initiated as required and depending on the application.

Figure 6B:
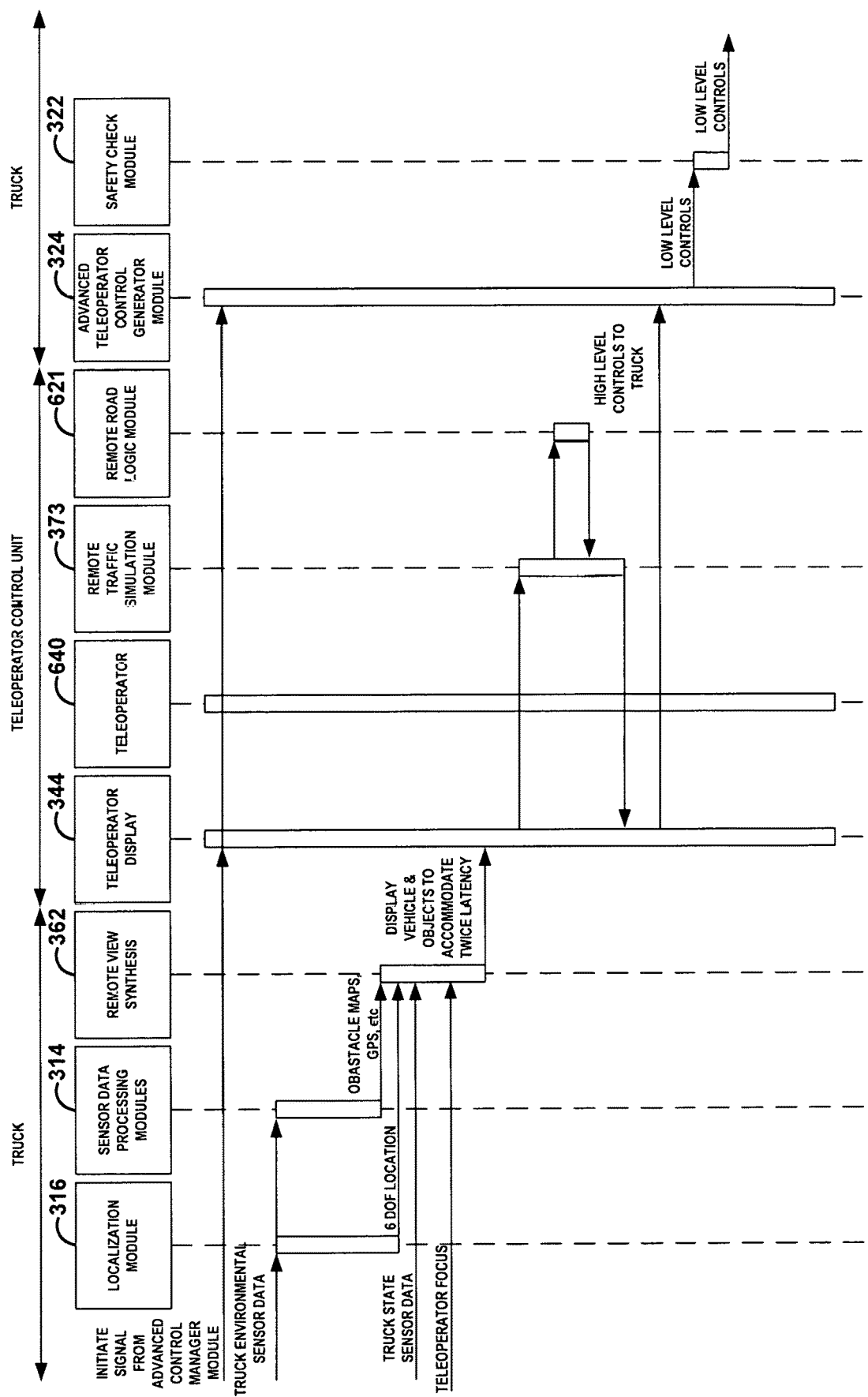
FIG. 6B is a conceptual diagram illustrating an example operation of a hybrid control system for a truck while operating based on tele-control in accordance with the techniques of the disclosure.

FIG. 6B illustrates an example advanced tele-operator control mechanism for trucks. Advanced control manager module 358 sends a signal to advanced tele-operator control generator module 324 and to tele-operator display 344, indicating that the teleoperation mode is now responsible for operating the agent. In this configuration, remote traffic simulation module 373 and remote road logic module 621 aid the tele-operator in making decisions about how to maneuver the truck. In addition, sensors 357 send data regarding the environment around truck 300B and about the state of the operating mechanisms of truck 300B. Also in this configuration, safety check module 322 is initiated and checks for safety before the low-level signals get applied to the operating mechanisms.

FIG. 6A and FIG. 6B illustrate additional features in relation to the bandwidth and latency management—these concepts will be described in later sections.

Safety Check Module

Safety check module 322 has been described previously as the module which checks the safety of the low-level controls before the controls are applied to the agent. Various implementation methods may be utilized for the safety check module. In one method, safety check module 322 checks to ensure that the controls are within predetermined thresholds and if the change in the control values is also within a threshold. Thus for the example of a truck, safety check module 322 may check to see if the speed control when applied results in a speed that is no more that some predetermined value above the speed limit. Thus the truck may never be instructed to go over 20 MPH over the speed limit. These safety checks, as indicated previously, may be applied to the autonomously generated signals or signals generated due to the teleoperation control. In some examples, safety check module 322 may not let the speeds change from one value to another value when the controls results in a speed change of over a predetermined limit, for example 10 mph within 1 minute.

Safety check module 322 may perform other safety checks such as (but not limited to) allowing only a certain range of braking force, or allowing only a certain range of steering angle. These ranges and thresholds may also be different based on the specific environmental situation. For the example of a truck, safety check module 322 may generate the thresholds and ranges to be more restrictive for bad weather conditions. As an example, safety check module 322 may not allow the truck to travel over 30 mph when there rain is detected. For a service robot in a home environment, safety check module 322 may not allow the robot to move more than a few inches per second; however for a service robot in a hotel environment, safety check module 322 may allow the robot to travel faster.

Emergency Safety Module

This function of emergency safety module 364 is to generate a set of controls that allow the agent to operate in a safe mode while no other control is available or safe to apply. As an example, if autonomous control is not possible and no tele-operator controls are available, emergency safety module 364 may issue controls for the agent to stop working and await further instructions. Thus, emergency safety module 364 may be regarded as a special case of autonomous control generator module 312; however, emergency safety module 364 with a specialized purpose to generate controls so that the agent can come to an eventual stop and not cause any harm.

Emergency safety module 364 may always be active and may always generate controls, even when the emergency controls are not being applied. Thus, emergency safety module 364 may generate a safety plan for every instant based on the agent's current situation, where the safety plan constantly gets updated if required, so that suitable emergency controls are immediately available if ever needed.

If the agent is a truck, if autonomous control is not possible and no tele-operator controls are available, emergency safety module 364 may e.g. issue controls to the truck to drop down the speed, turn the hazard lights on, and autonomously drive to the right shoulder and stop. Thus again, emergency safety module 364 may be regarded as a special case of autonomous control generator module 312 with a specialized purpose of generating controls so that the truck can come to an eventual stop. Also, as before, emergency safety module 364 may always be active and may always generate controls regardless of the utilization of these controls. Thus for the case of the truck, emergency safety module 364 may have an emergency plan for every instant based on the truck's current situation, where the goal for the emergency plan for any instant may be for the truck to eventually travel to the right shoulder and stop.

In some examples, emergency safety module 364 can be implemented as a redundant system, to account for the risk that the processor that is responsible for the operation of the vehicle control system may experience a failure. If emergency safety module 364 were also dependent on this same processor (e.g., agent processor 350), then the safety measures could be taken. Therefore, emergency safety module 364 may be implemented redundantly on a separate processor with a separate power supply from agent processor 350. Thus, even if the main power supply fails, emergency safety module 364 could execute with its own power supply.

Advanced Control Manager

As mentioned earlier in some examples, an advanced control management mechanism is provided that enables control through one or multiple paradigms or through the creation of a hybrid control that combines one or multiple controls. In some examples, this mechanism accepts control signals from autonomous control generator module 312, tele-operator control unit 330A, and emergency safety module 364, and chooses or creates the appropriate control signals and issues these controls to the operating mechanisms of the agent. Mathematically, this can be described generally as:

$$Q = f(A, T, E) \qquad \text{Eqn. 1}$$

Where Q is the final output control signal, A is the autonomous control signal, T is the tele-operator control signal and E is the emergency control signal. The function f can be defined in various ways—these correspond to the control paradigms. Some examples of the function f are provided below.

Example 1 (Direct Control): Always Prioritize the Tele-Operator Control if Present Thus here $$Q = T, \text{ when } T \ne \emptyset \qquad \text{Eqn. 2}$$

And $$Q = E, \text{ when } T = \emptyset \text{ and } A = \emptyset \qquad \text{Eqn. 3}$$

$$Q = A, \text{ when } T = \emptyset \qquad \text{Eqn. 4}$$

Thus eqn. 2 states that when T is not a null set, the final output is set equal to the tele-operator control. Also, the final output is E if T and A are null sets (Eqn. 3). Eqn. 4 states that when T is a null set, apply the autonomous control.

An implementation of this control paradigm is illustrated in FIGS. 5A and 5B and FIGS. 6A and 6B. In each of these figures, an initiate control signal from advanced control manager module 358 sends a signal to the specific module to proceed with its computation. As an example, in FIG. 5A and FIG. 5B, advanced autonomous control generator module 312 has been given the responsibility to generate signals. This corresponds to Eqn. 4. Thus in this case, advanced control manager module 358 determined that a tele-operator signal was not available. This may have been already planned as per the master plan (FIGS. 4A-4C), or it may be an action that was chosen by the tele-operator. In other words, in the latter case, the tele-operator may have chosen to hand over the control to the autonomous control mechanism; in some embodiments, the tele-operator control unit may have a user interface mechanism for the tele-operator to indicate such hand over.

Conversely, in FIGS. 6A-6B, advanced tele-operator control generator module 312 has been given the responsibility to generate signals, having received an initiate signal from advanced control manager module 358. Thus through a signaling scheme, advanced control manager module 358 controls which control paradigm should be activated.

Figure 7A:
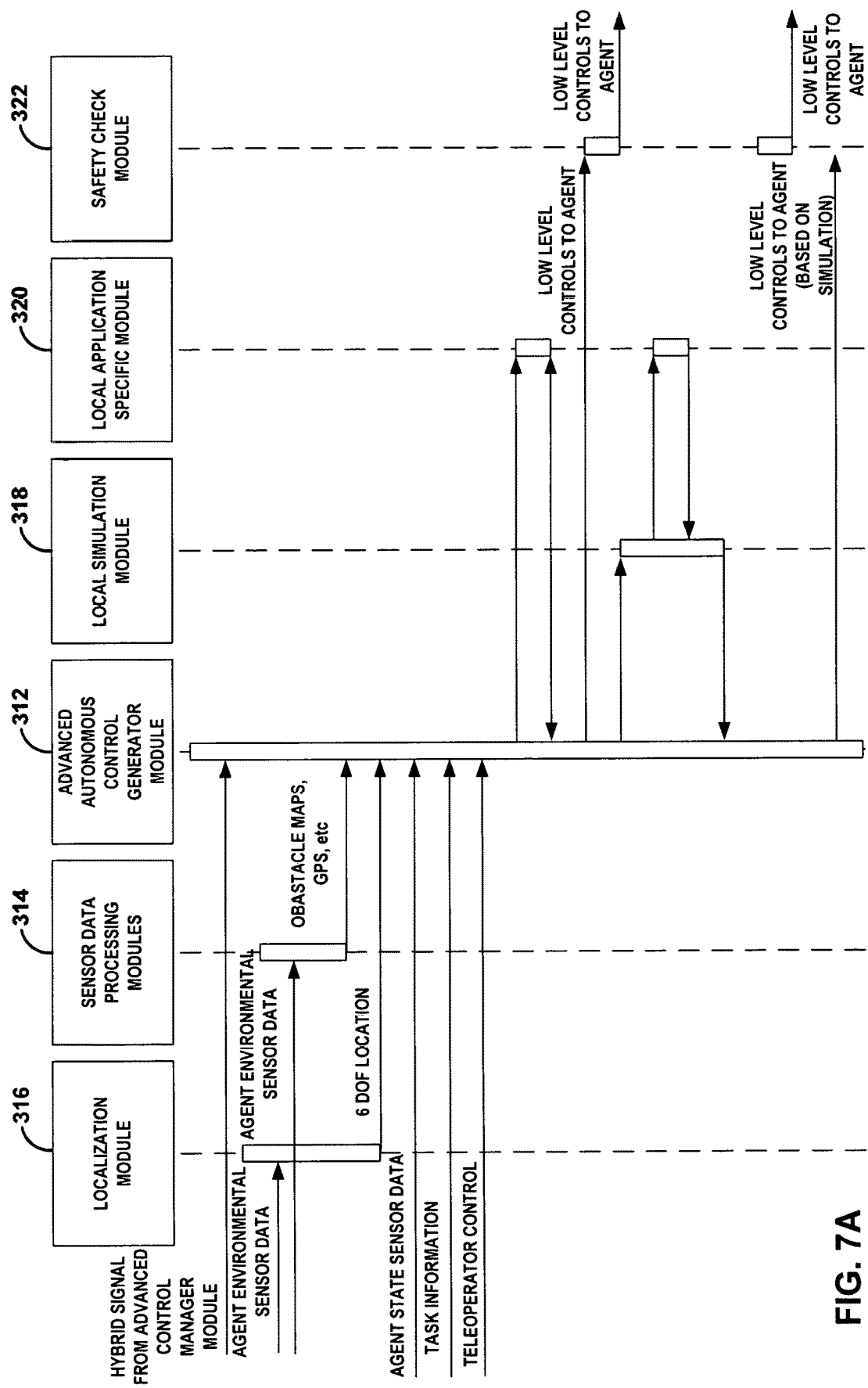
FIG. 7A is a conceptual diagram illustrating an example operation of a hybrid control system for an agent while operating based on autonomous and tele-control in accordance with the techniques of the disclosure.
Figure 7B:
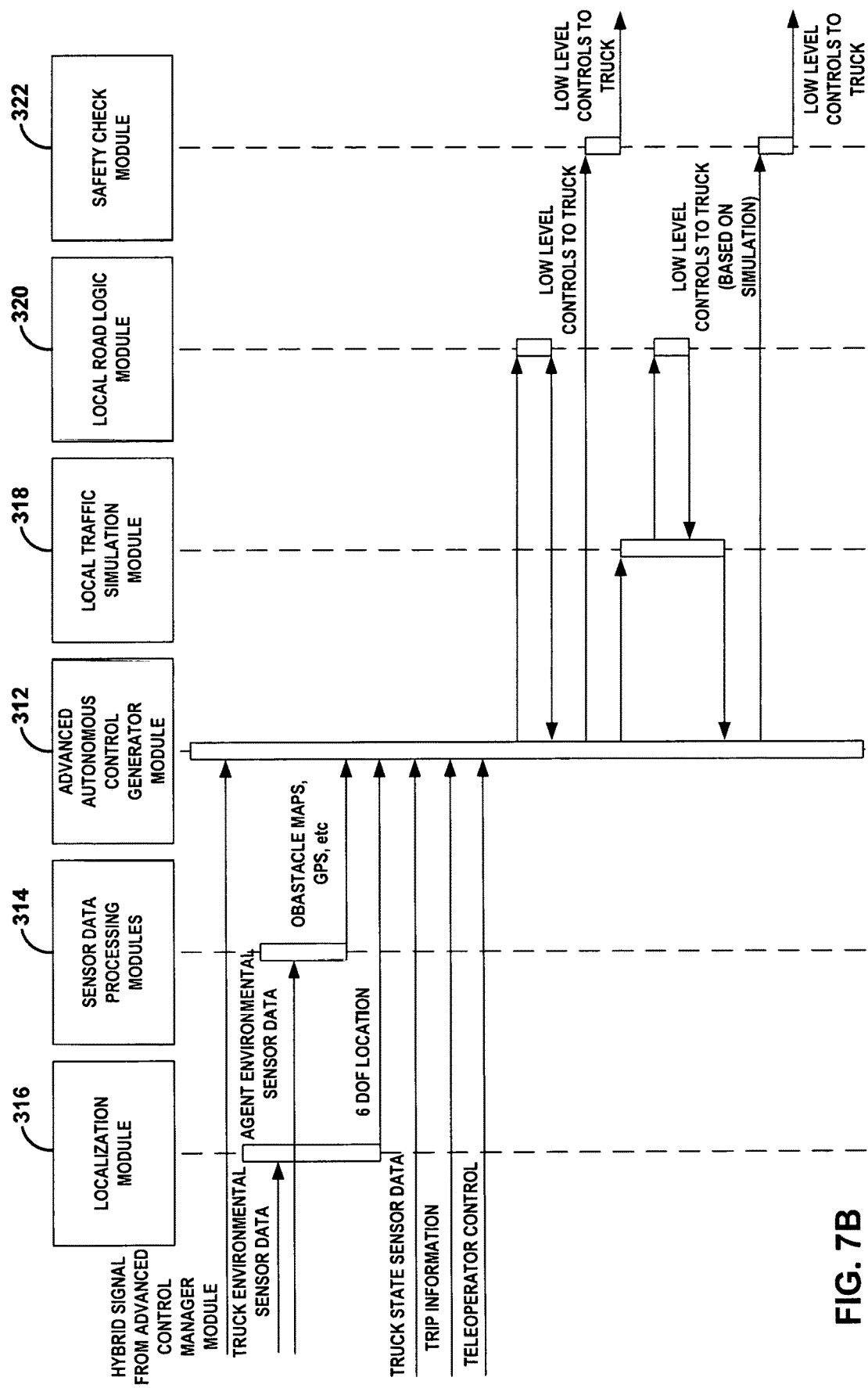
FIG. 7B is a conceptual diagram illustrating an example operation of a hybrid control system for a truck while operating based on autonomous and tele-control in accordance with the techniques of the disclosure.

Example 2 (e.g., Hybrid Control): Combination of the Tele-Operator Derived and Autonomous Derived Commands In this paradigm, the tele-operator issues a control and this control is input into the autonomous controller. This is indicated in FIGS. 7A-7B with the tele-operator input feeding into the advanced autonomous control generator module. This control paradigm may be activated by the advanced control manager module by sending a distinct signal to the advanced autonomous control generator module. Thus for a service robot, the tele-operator may issue a control such as "clean this room" however advanced autonomous control generator module 312 may generate the command "clean this room with a carpet tool where there is carpet and with a bare floor tool where there is no carpet". For trucks, the tele-operator may issue a control such as "exit at the next exit" and the advanced autonomous control generator module 312 may generate controls to change lanes and get into the right most lane and make an exit at the next exit ramp". Thus mathematically the hybrid control signal may be represented by:

$$Q = A(g(T)) \qquad \text{Eqn. 5}$$

This equation states that the final output Q may be the autonomous signal A which subsequently is a function g of the tele-operator signal. This in this case, the commands are combined and the final output is derived. For example, advanced autonomous control generator module 312 may dynamically adjust, in real-time, the master plan for a high-level task of the one or more high-level tasks from the installed master plan based on a final output derived using input from the tele-operator.

Although only two examples are provided, other configurations are also possible. Thus with the implementation above, the advanced control manager module allows multiple ways to control the truck including techniques that combine signals.

In an additional aspect of the hybrid control, the tele-operator may choose the level of control. As an example, the tele-operator may issue a high-level control such as "travel from location A to location B" and hand over control to the autonomous control generator. On the other hand, the tele-operator may issue a lower level control such as "accelerate up to 65 mph from 60 mph". The level of control may be indicated along with the control itself by the user input processing module, and both pieces of information may be passed along to the local system for appropriate interpretation of the tele-operator control.

In some examples, the tele-operator may choose the control paradigm. The tele-operator may know from experience, the level of difficulty of performing a task. Such past experience may also include experience regarding how well each of the control paradigms has worked in the past. Thus this experience may be utilized by the tele-operator to choose the control paradigm. To enable this, a suitable user interface, such as (but not limited to) a switch, may be provided at the tele-operator control unit.

Localization Module

Figure 8:
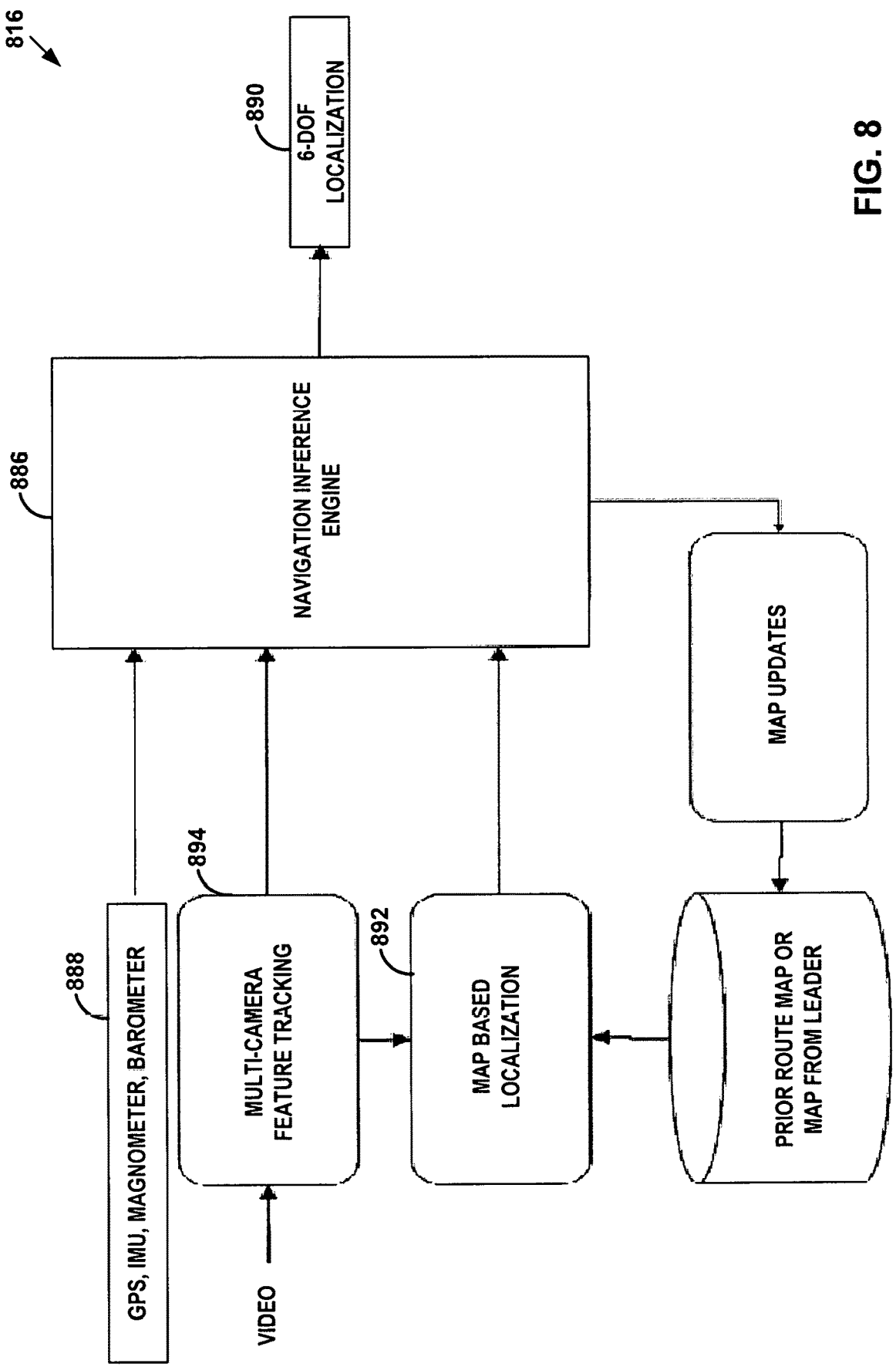
FIG. 8 is a block diagram illustrating an example localization engine in accordance with the techniques of the disclosure.

FIG. 8 describes localization module 816, which may be an example of localization module 316. The function of localization module 816 includes localization and mapping. These functions will be described now.

Localization Function

Localization module 816 accepts data from one or more sensor modalities to create accurate localization of the agent. Depending on the type of agent, the input sensors may include one or more Inertial Measurement Units (IMU containing Accelerometers, Gyros), GPS, monocular and stereo cameras, LIDARs, barometers, magnetometers, RF ranging and wheel odometry. As an example, a service robot may only be installed with stereo cameras and an ultrasound range finder. In contrast, a truck may be installed with all of the sensors listed above.

Depending on the type of sensors installed, this module may simultaneously map the environment and localize the position of the agent. For example for a truck, the simultaneous mapping may be achieved by exploiting and tracking features in the camera and/or LIDAR data. This may be achieved by using the factor-graph based inference framework that can generate measurement data from the above sensors to infer the location and the map data efficiently. The factor-graph inference framework is implemented within navigation inference engine 886. Navigation inference engine 886 accepts inputs from the map-based localization 892, from the one or multiple sensors 888 such as but not limited to the GPS, IMU etc., and from the output of the tracking sub-modules 894, to produce an accurate 6-DOF localization 890 of the truck.

Localization module 816 is capable of accommodating drop outs from the data sources and work with partial data to solve for the localization. One instance of such localization is when no GPS data is available or unreliable. Localization module 816 is able to accurately continue localization through the GPS outages. For the example when the agent is a truck, this capability may be advantageous when moving through mega cities or tunnels where GPS may be unreliable. Other sensors may also be subject to momentary data drop outs. This may happen for example when video fails due to glare or sudden darkness. Navigation inference engine 886 is able to function even under such circumstances.

Navigation inference engine 886 provides a low-latency solution while estimating the full optimal navigation state. This approach uses Sliding-Window Factor Graphs, which provide a flexible foundation for navigation using any sensor. In the Sliding-Window Factor Graphs approach, the measurements from any sensor are encoded as factors and navigation state inference is done inside a sliding time window using a smoothing algorithm. The estimation is split into a fast, short term optimized smoother, a slower but fully optimal smoother, and a shared map of 3D landmarks. The use of this capability improves the accuracy of mapping and localization. In addition to producing the localization, the inference engine is also capable of generating high-rate poses at IMU rate. This allows IMU based prediction and allows the creation of ultra-low-latency poses to support highly reactive behaviors.

Drop Out Behavior

Drop outs in data sources are likely to happen. As noted above, navigation inference engine 886 is able to accommodate drop outs. However, as the time-duration of the drop outs increases or in other situations such as but not limited to crowded environments, agents such as a truck may pose increasing risks to themselves and the environment around the agent. Thus in one feature, depending on the length of the drop out or other measures such as latency measures, the advanced control manager may invoke the emergency safety module. The behavior of the emergency safety module may be programmed to change depending on the length of time the adverse situation exists. As an example, once the adverse situation commences, for a defined length of time (that may in turn depend on the current speed for a truck) the emergency safety module may cause the agent to slow down. As a further example, if the agent is a truck, the emergency module may cause the truck's hazard lights to be turned on for a period of e.g. 30 secs. If the adverse behavior exists for more than 30 secs, then the truck may be instructed to go 25 MPH, for example. Finally, if the adverse behavior exists for more than a minute, the earlier-described behavior of moving from the right lane to a shoulder and coming to a stop may be imposed.

Extended Maps

During the course of operations, the agents are exposed to information that may not normally appear in maps. Thus as this information is sensed, the new information is added to the existing maps. In the example of a truck, conventional maps show roads and highways and may even have information about the condition of the road. However, information about the shoulders of the roads and highways are typically not available. Trucks, due to their size, may tend to use the shoulders more than cars; thus obtaining and storing information about the shoulders may lead to benefits. As an example, if the shoulders are soft and if a truck senses that through a sensor, then a truck that travels the same spot at a later time may avoid that location.

Creating a New Type of Map

In one feature, controls, regardless of the paradigm used to generate those controls, are also stored along with the location where the controls were active and the activity the agent was performing. FIG. 9A illustrates one example structure of such a map 900A for a home robot. In this map 900A, a home robot in a particular home is in a kitchen and is doing the activity of stacking plates in a cabinet. Assuming a tele-operator is operating a robot, based on trial and error, a successful series of steps may be (1) pick up the plate with a grasper (2) step back 2 feet from the counter and (3) extend arm (that is coupled to the grasper) 30°. The actual data stored may use a binary format to represent that series of controls, English phrases are used here only as an illustration. In addition, the data may be stored with greater precision and detail than depicted in the figures. One benefit is that when the same or different tele-operator is asked to perform the same task at another time at the same location, these controls may be displayed on the tele-operator display. The tele-operator may use this as a guide to perform the task.

FIG. 9B illustrates one example structure of a map 900B that stores control data and other data such as (but not limited to) environmental data and activity data, for a truck. Here the location is stored as latitude and longitude. The activity being performed along with the environmental conditions is also stored. In this example, this truck is making a turn in a street covered by 2 inches of rain. The high-level controls outline a series of steps that was successful in making this turn in the past by other tele-operator drivers doing this same activity. These steps may be displayed on the tele-operator display and may be used as a guide to perform the task. These maps (e.g., map 900A, map 900B, etc.) may be loaded into the processors of the local system (the truck) and the remote system (e.g., the tele-operator control unit) when the trip is being planned and displayed at the appropriate time when the location and activity match the current location and activity.

While the examples above are for the teleoperation paradigm, the same concepts apply to other control paradigms as well. As an example, a successful autonomous control doing a particular activity may be stored along with the location and other information. This stored information may be used by safety check module 322 to assess whether in a current situation of an agent performing the same activity at that same location, the currently generated controls are consistent with previously generated successful controls.

Sensor Data Processing Module

Figure 10:
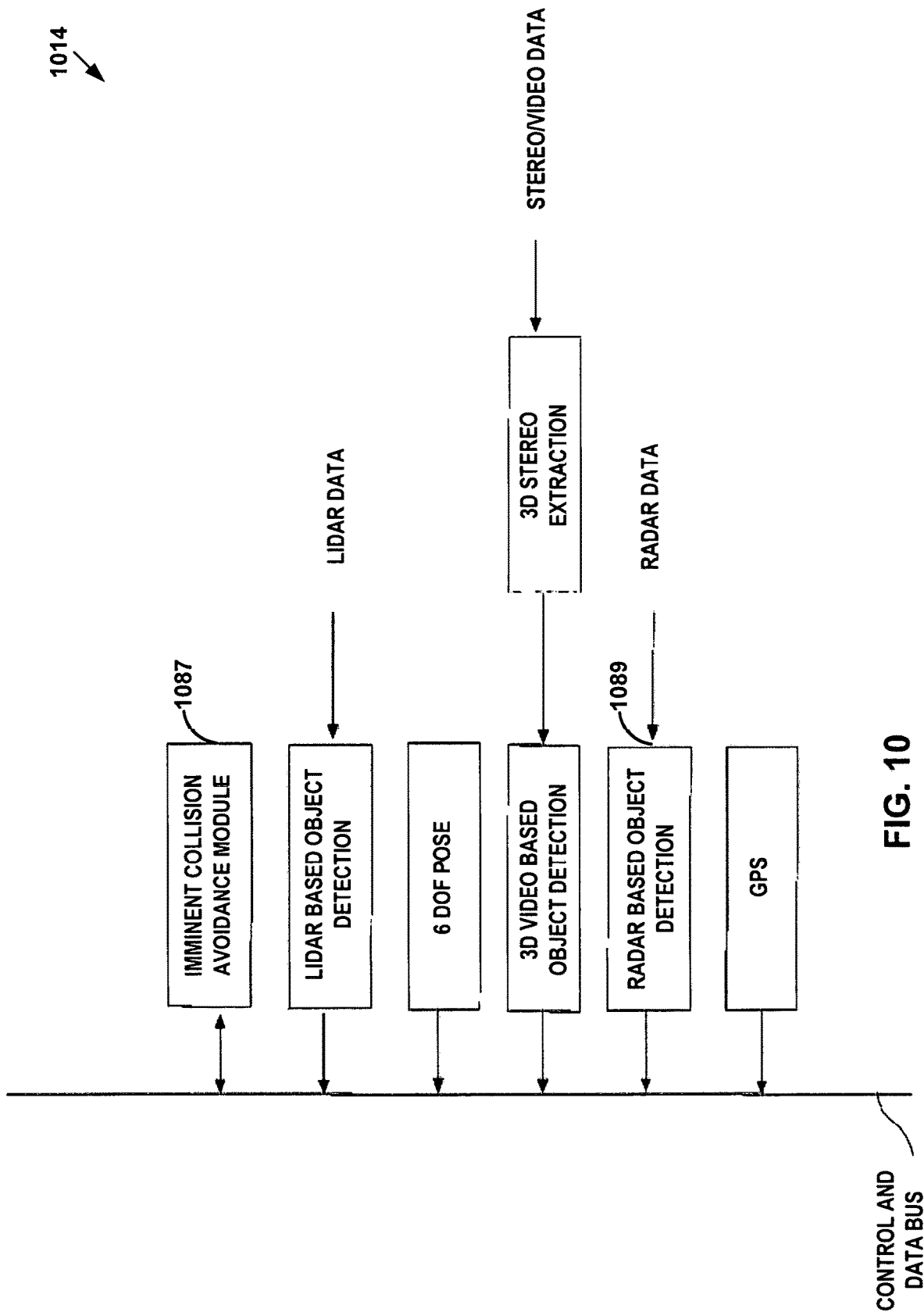
FIG. 10 is a block diagram illustrating an example sensor data processing module in accordance with the techniques of the disclosure.

FIG. 10 illustrates sensor data processing module 1014, which may be an example of sensor data processing module 314. Sensor data processing module 1014 may contain several sub-modules examples of which are shown in the figure. Each submodule may receive data from a sensor, process the data and subsequently send the processed data to other modules through the control and data bus. One output of the processing may include maps of objects that are detected by the sensor. As an example, the radar data may be input into the radar-based object detection sub-module 1089. Radar based object detection sub-module 1089 may create an object map based on the objects that the radar senses. In this particular case since radar processing is capable of measuring the velocity of objects, each object that is sensed may also be associated with its velocity and with a trajectory based on the pose of the detected object. The processing described above for radar data may be utilized for other sensors as well, such as lidar data. Thus, these one or multiple obstacle detection modules may input the results of their processing to the other modules, such as local simulation module 318 and application specific module 320. Local simulation module 318 and application specific module 320$ay$ use the obstacle maps to create a composite dynamic obstacle map that may be used for example by the autonomous controller to perform a task. See for example U.S. Pat. Nos. 9,476,730 and 9,488,492, each of which is incorporated herein by reference. It is to be noted that while FIG. 10 shows multiple sensors, the number and type of sensors may vary for each agent.

In another application sensor data processing module 1014 accepts data from one or multiple sensors and bypasses the regular processing. If an imminent collision is predicted, imminent collision sensor 1087 may immediately send signals to the one or multiple modules such as but not limited to emergency safety module 364. Imminent collision sensor 1087 may initiate immediate safety actions. For example, imminent collision sensor 1087 may be programmed to send low-level control signals such as but not limited to a brake signal (e.g., in case of a truck) to the operating mechanisms of the agent, to ensure that action is taken quickly.

In addition to the implementation where the signals are sent directly from imminent collision module 1087 to the operating mechanisms, other implementation techniques may also be utilized. In one implementation, after the dynamic obstacle map is created, this map may be displayed as a 2D top down grid that may be located relative to the vehicle. Local simulation module 318 may use the map and the grid to calculate an associated cost of moving the vehicle to an adjacent grid cell. The evaluation of the cost function can include the vehicle size/shape, vehicle dynamics, vehicle position and an uncertainty of static and dynamic objects in the scene. The cost function may be created for multiple grids cells adjacent to the grid cell the truck is located in. Using the cost function, a cost map may be created both for instantaneous evaluation and/or for a future instance in time. Thus the risk of imminent collision may be calculated this way. The cost map may be subsequently utilized to generate an operational control for the truck. This cost map may also be utilized to evaluate if a certain operational control is safe to apply.

Simulation Module

The functions of the simulation module (e.g., local simulation module 318, remote simulation module 372, etc.) have been described throughout this disclosure. One function of the simulation module is to perform simulations to determine how best to achieve a task. Several aspects of how to achieve a task may be simulated. In one aspect, the simulation module may be initiated prior to commencing a task. The simulation module may determine the most appropriate control paradigm for the task based on the same task done previously by the same or different (but same type of) agent and by the same or different tele-operator. The results of this type of simulation may be input to master coordinator 352.

In another aspect, the simulation module may be called upon by autonomous control generator module 312 to determine an appropriate control for the task. In another aspect, the simulation module may be implemented within the agent and within the remote tele-operator unit. The simulation modules in the agent and the remote tele-operator control unit may largely have the same functions although each of the simulation modules may have some specific capabilities. As an example, remote simulation module 372 within the tele-operator control unit may perform simulations by including latency. This is explained below.

As also mentioned previously, the simulation module is application specific. Thus for the service robot, the simulation tools may be designed to provide guidance in grasping objects while for the truck, the simulation tools may be designed to provide a traffic simulation that may include the position of the host truck and of the various static and dynamic objects in the near vicinity of the truck. The simulation in each of the applications may be provided with data from the one or multiple sensors. In performing the simulation, the simulation tool may associate several attributes to the objects such as (without imitation) the physics model of the object. Thus for the truck application the simulation tool may provide information about the truck and the surrounding objects at the current and future instant of time. Similarly for the service robot, the simulation may provide the information about the future position of a grasper in relation to the object it is trying to grasp. In either case, the information may be provided to one or other modules. As an example, the results of the simulation may be displayed on a screen.

In another aspect related to the truck, as the truck typically may be considered a two-body object (e.g., the cab and the trailer), a two body physics model of the truck may be utilized. This may be beneficial in providing more accurate controls; as an example, a two-body model may result in better controls for the truck going in the reverse direction. The possible motion of the truck may be simulated more accurately.

In another aspect also related to the truck, the trailer may not be equipped with sensors. In other words, the sensors may only be installed on and around the cab. Simulation models with the two-body truck model may be beneficial in accommodating this type of sensor configuration.

Application Specific Module

Application specific module 320 provides information to local simulation module 318 that is specific to the agent and specific to the environment the agent is in. As an example, if the agent is a home robot, then application specific module 320 may include specific information about the home such as but not limited to rules followed by the inhabitants of that home. Examples of such rules include but may not be limited to the rules regarding where to keep the mail or the keys. These rules may be used by the simulator is the tasks require the robot for example to put the mail away. Local simulation module 318 may simulate several pathways to reach the desired location.

For the example of a truck, the application specific module (called road logic module 321) may include the rules of the road, physics engine of the host truck and of dynamic objects that are encountered on a road (vehicles, people, etc.). The physics model may provide for example how the detected object may move given that the object has been appropriately classified. As an example, a pedestrian may only move at a certain speed where as a vehicle may move at much higher speeds. Even within vehicles, a small car would be associated with a higher acceleration capability that a large truck. This type of data may be utilized by local simulation module 318.

Additionally, road logic module 321 may provide the constraints on how the vehicle can react. Mathematically, it is represented by a model of the road at the specific location of the truck. Example of road rules include general rules that all traffic must follow such as but not limited to (1) pass on the left, (2) exits are typically on the right, (3) vehicles on an on-ramp will need to merge into the right most lane, (4) lanes may end as indicated by road signs. Thus for example, if the truck is on the right most lane and the sensors detect a upcoming merge, the road model would include this information. Here, if a vehicle were to be detected on the on-coming ramp, the simulation tool may take these pieces of information and predict an increased risk of collision. This information may be passed on to other modules such that appropriate actions may be taken to reduce that risk.

Latency

The commands and data between the agent and the remote operator control unit may be transmitted wirelessly. Wireless communication may be subject to latency and bandwidth issues. The effects of latency may differ for each application. In some applications, it may not be necessary to overcome the effects of latency. Some tasks such as tele-operated folding of clothes may not require overcoming the effects of latency. In some other cases, such as helping an aged person out of a chair with a home robot, where the actions of the robot may have to be coordinated with the actions of the aged person, reducing or removing latency may be beneficial. For the example of trucks, reducing or removing effects of latency is advantageous as the risk of endangering people or property is inherently high.

The features described below are designed to accommodate latency issues. In terms of latency, a latency monitoring concept is first described. In this concept, both the agent and the remote operator control unit receive GPS signals. Since GPS signals also contain time information, this information may be used to determine the latency. A time coded signal may be sent by the agent to the remote operator control unit and the difference in time between the coded time and the actual time (as determined by the GPS) may be used to calculate the latency. This monitor may be running continually or may be run periodically. Other methods may also be used to determine latency. The latency information may be sent to other modules.

Use of Latency Information within the Tele-Operator Control Unit

Several features are described below that may reduce or remove the effects of latency. In one such feature, the tele-operator controls are provided prior to the time when they are needed. This may be implemented in various ways depending on the application. For the example of the home robot helping an aged person to get up from a chair, the tele-operator may be able to view the data from the local sensors on the tele-operator display (with latency) and may anticipate what the robot should do in a future instant of time. In this example, since the motion of the aged person is likely very slow, the tele-operator may have sufficient time to anticipate the next move of the person and therefore issue and transmit timely controls to the robot as required.

For the example of a truck, the method of mental anticipation may not be adequate, as the environment around the truck may be changing very quickly. Here remote simulation module 372 may incorporate the latency information into calculations performed by remote simulation module 372, such that the commands issued by the tele-operator arrive at the truck when they are needed. In this feature, remote simulation module 372 may display a graphic of the truck on a map where the location of the truck on the map is ahead of the actual location of the truck by the amount proportional to the latency. This will in turn cause the tele-operator to issue commands that are executed on the truck at the time when they are actually needed. As an example, if the one-way latency is 200 milliseconds (ms), the remote simulation module may display the position of the truck 12 meters (m) ahead (due to the two-way latency) of where it actually is, assuming the speed is 30 meters per second (m/s) (approximately 65 miles per hour (mph)). Thus, the tele-operator will be issue a command appropriate to that future location.

By the time the command reaches the truck, 400 ms will have passed, and the tele-operator control received will then be appropriate for the actual location of the truck. As latency may continually change, the display of the truck on the operator control unit may also be continually be modified to accommodate the current latency. In addition, as information about the objects around the truck and their current speed and trajectory would be sensed, the remote simulation module may calculate the future position of one or multiple of these objects including the effects of latency, and display a composite map of with the position of the truck and one or multiple objects around the truck for a future instant of time. With this technique, the tele-operator will observe how the traffic situation is predicted to evolve at a future instant of time, and will issue a control based on that.

The hybrid control paradigm described earlier provides an advantageous benefit in this case, as a hybrid control for a future instant of time may be modified by the local autonomous controller at the appropriate time according to locally sensed information. The techniques of providing a command ahead of when it is needed, along with the concept of hybrid control, may prove beneficial as well. Here a high-level command is issued by the tele-operator ahead of when it is needed, but the advanced autonomous controller modifies the command according to the locally sensed information.

The generation and use of a master plan was also described earlier. In a variation of that feature, a hybrid control may be issued for each location in the master plan. In this variation, for each location, the hybrid control is applied prior to when it is needed, with the autonomous controller modifying the command according to locally sensed information.

Machine Learning Module

Machine learning module 360 may be implemented either within the agent or within the tele-operator control unit or on both locations. With reference to the module within the agent, machine learning module 360 accepts data generated by the various sensors, information generated by the various modules, and the final control applied for a specific task at a specific location, and stores this information in a database. If the final control signal resulted in an operation that was safely concluded, this control for the set of conditions prevalent at that time is learned as a positive example. Thus, for the example of trucks, for trucks travelling between the same two source and destination locations, machine learning module 360 may learn a set of control information (called the "learned set") for all locations between the source and destination locations over time.

The learned set may be used for various purposes. The learned set may be used to dynamically update the master table in FIG. 4A-4C (depending on the application) such that the need for teleoperation may decrease over time as more of the appropriate controls are learned for various situations. Said differently, for example, machine learning module 360 may learn low-level controls to increase a level of autonomy for a given high-level task of the one or more high-level tasks. In addition, the learned set may be used by safety check module 322 as a reference against which any new commands are compared. Any variance from the learned set may be flagged, and appropriate actions such as warnings may be issued.

In some examples, machine learning module 360 learns may also learn from a negative example. If the final control resulted in result that is not desirable, such as a crash or an accident or the falling over of a service agent etc., machine learning module 360 learns may learn the controls and the situation that led to that result but in this case, these same or similar controls would not be applied when the situation is encountered next.

Machine learning module 360 may include an "unlearning" mode. As an example, a specific behavior may be learned for a specific location (e.g., a segment of highway) during a time when construction was in progress. Thus, the learned behavior used by machine learning module 360 may be to go slow through this area. However, when construction ends, machine learning module 360 may unlearn this behavior. To achieve this, machine learning module 360 may periodically (or constantly) check a learned model of machine learning module 360 against what the simulation module predicts based on current road conditions. If a variance emerges, then additional steps may be taken to verify if a new model is warranted. As an example, the speed of other vehicles may be examined. If the average speed of the surrounding vehicles is faster than the learned speed, then machine learning module 360 may make a determination that the model needs to be updated for that segment of highway.

Remote View Synthesis

Figure 11:
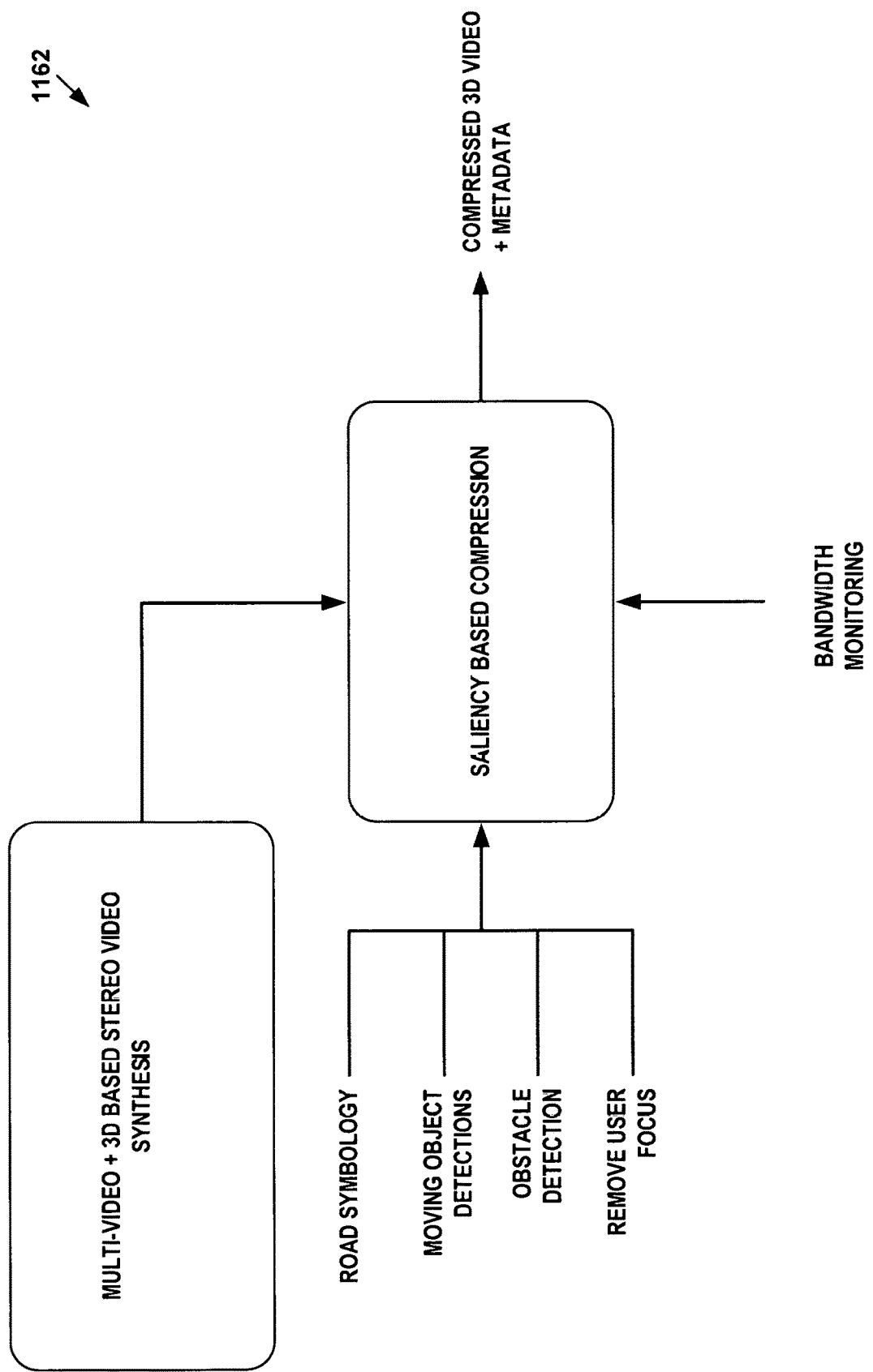
FIG. 11 is a block diagram illustrating an example remove view synthesis module in accordance with the techniques of the disclosure.

FIG. 11 illustrates remote view synthesis module 1162, which may be an example of remote view synthesis module 362. For teleoperation, the agent needs to send visual and non-visual metadata to the remote tele-operator. Visual data may include steaming video for one or more cameras or one or more synthesized views. A synthesized view consists of a new view generate from a multiplicity of cameras to create a coherent view at a resolution suitable for remote consumption.

The view selection can be guided by one or multiple factors such as but not limited to (a) Camera with overlapping views but different settings or modalities, (b) Different views that the remote operator would be accustomed to (for trucks this may correspond to frontal view, side-mirror views, back-mirror view), (c) Guided by the active intent of the tele-operator (where he/she is looking or action they may be taking (d) and/or Movement of the other vehicles and importance of that information to the tele-operator. The metadata including vehicle localization and dynamics, other location and dynamics of other moving objects may also be streamed synchronously to the tele-operator control unit.

Streaming of this high-bandwidth data require significant compression to fit on low-bandwidth wireless links. Standard video compression may be used for this purpose. However, bandwidth can be further reduced by using prior map-based change and saliency based pre-filtering methods. If prior map data is already available to recreate a view of the static environment, only the video surrounding the moving agent may need to be sent. In addition, saliency-based compression allows pre-smoothing some areas of the video to ensure fewer bits are allocated to these regions. See e.g. U.S. Pat. Nos. 9,036,693 and 9,210,444, and US patent publication no. 2014/0269910, each of which is incorporated herein by reference. The saliency measure may be programmed to provide addition bits as needed to one or multiple of (a) objects around the agent such as pedestrians and other vehicles for the example of trucks, (b) areas of gaze of the tele-operator, (c) imminent collision logic and/or (d) dynamic monitoring of wireless bandwidth.

The streamed data may then be re-created on tele-operator control unit 330A by visualization module 370 for the tele-operator. The re-synthesized view can incorporate additional overlays based on metadata. For the example of a truck, this may include simple information that a regular vehicle dashboard would provide.

In addition to the streaming video an optional stream of 3D data can be generated based on the dynamic map or stereo video or integrated LIDAR data. Additional compression can be applied to this data based on 3D data redundancy temporally and spatially and based on saliency-based criterion. Redundancy may be calculated based on prior 3D map that is loaded on the vehicle and the remote site. The 3D data can be re-synthesized on the remote site to provide a 3D map of the world around the agent for example the truck. At the tele-operator control unit, the 3D data can also be combined with the video and metadata to create new perspective views that is not constrained by the normal position if the operator were to be physically operating the agent. Thus, as an example a "bird's eye view" can be generated and presented to the tele-operator.

For the example of a truck, a bird's eye view may include the cab and the trailer and the objects around the truck, along with the lane markings. In addition, if information about controls successfully completed in the past are available for the specific set of conditions that the truck is experiencing, this may be displayed as well. This type of display may prove to be beneficial for the tele-operator in addition to the view from the cameras. The same type of view may be advantageous for other examples as well such as for the home robot. Providing different synthesized views may provide benefit for example to understand how to grasp an object.

Tele-Operator Control Unit

Some modules within the tele-operator control unit have been mentioned earlier. Additional information about this unit is now provided.

Trip Planner Module

Tele-operator control unit 330B may include trip planner module 375. Here a tele-operator may enter details of the trip via a user interface along with other information. As noted earlier, trip planner module 375, may segment the trip into multiple smaller trip segments where each trip segment may be uniquely identified by a location. This information may be provided to the remote simulation module to create a master plan.

Sensor Data Processing Module

Tele-operator control unit 330A may also be equipped with sensors 357 although in this case, sensors 357 may be monitoring the tele-operator rather than the agent. In one benefit, if a tele-operator unit has multiple displays, arranged to simulate what an operator physically operating the agent may see, the gaze direction of the operator may be deduced from the sensors. This information may be used to manage the information coming back from agent as described previously. For example, higher bits may be devoted to the information in the gaze direction of the tele-operator and lower bits may be devoted to all other information. This is a technique to reduce the effects of latency and bandwidth limitations.

Tele-Operator User Interface and User Input Processing Module

Various types of user input devices may be provided depending on the agent and the type of task the agent performs. In one concept described above, local (on agent) advanced control manager module 358 enables one or multiple control paradigms. This disclosure described earlier that the tele-operator may have the control to choose between different control paradigms. The user interface may be configured to receive input from the tele-operator. The user interface may include a switch or a radio button or other similar schemes—activating one of these devices would send a signal to one or multiple modules such as the advanced control manager module, regarding the choice of the control paradigm.

These user input devices may also include haptic feedback so that the tele-operator may obtain a better sense of the environment.

Storage

The storage function may be configured in various ways. FIG. 3B shows storage 382 explicitly in tele-operator control unit 330A and FIG. 3D shows storage 382 explicitly in tele-operator control unit 330B however storage may be provided in the agent and in the cloud. Regardless of configuration of storage 382, the information from the agent and from the tele-operator control unit and from other sources as required, may be consolidated.

As was described earlier, storage 382 may store the final controls that was applied to the operating mechanisms of the agent along with the set of conditions that existed at that time including conditions at the agent and conditions at the tele-operator control unit. This information may be used in various was including having it displayed on the tele-operator display or for checking the currently issued commands against previously successfully issued commands.

Concept of Control Paradigm Handoff

As was described earlier, advanced control manager module 358 enables one or multiple modes of control paradigms. To avoid any sudden variances leading to damage of the agent or of people or property in the near vicinity of the agent, the handoff period may be orchestrated by the advanced control manager module. In one technique at the moment of the handoff, advanced control manager module 358 may force the control signals for the two paradigms involved in the handover to be exactly the same. Subsequent controls may be applied in relation to the control at handoff. Thus assuming that the control was passing from autonomous control to tele-operator control, $$T(t_{handoff}) = A(t_{handoff}) \quad \text{Eqn. 6}$$

$$TS(t_{handoff} + \Delta t) = TS(t_{handoff}) + \Delta TS(t_{handoff} + \Delta t) \quad \text{Eqn. 7}$$

Where T stands for the tele-operator control, A stands for the autonomous control, $t_{handoff}$ stands for the instant of time when handoff occurs, TS stands for a specific tele-operator control and $\Delta t$ stands for a time delta after handoff. Eqn. 6 forces the controls produced by the two control paradigms to be the same. Eqn. 7 states that the control TS at $t_{handoff} + \Delta t$ is a differential control based on the control at $t_{handoff}$. As an example, if TS is a steering control, the new control issued by the tele-operator could be applied as a delta control starting from the current heading of the steering.

Figure 12:
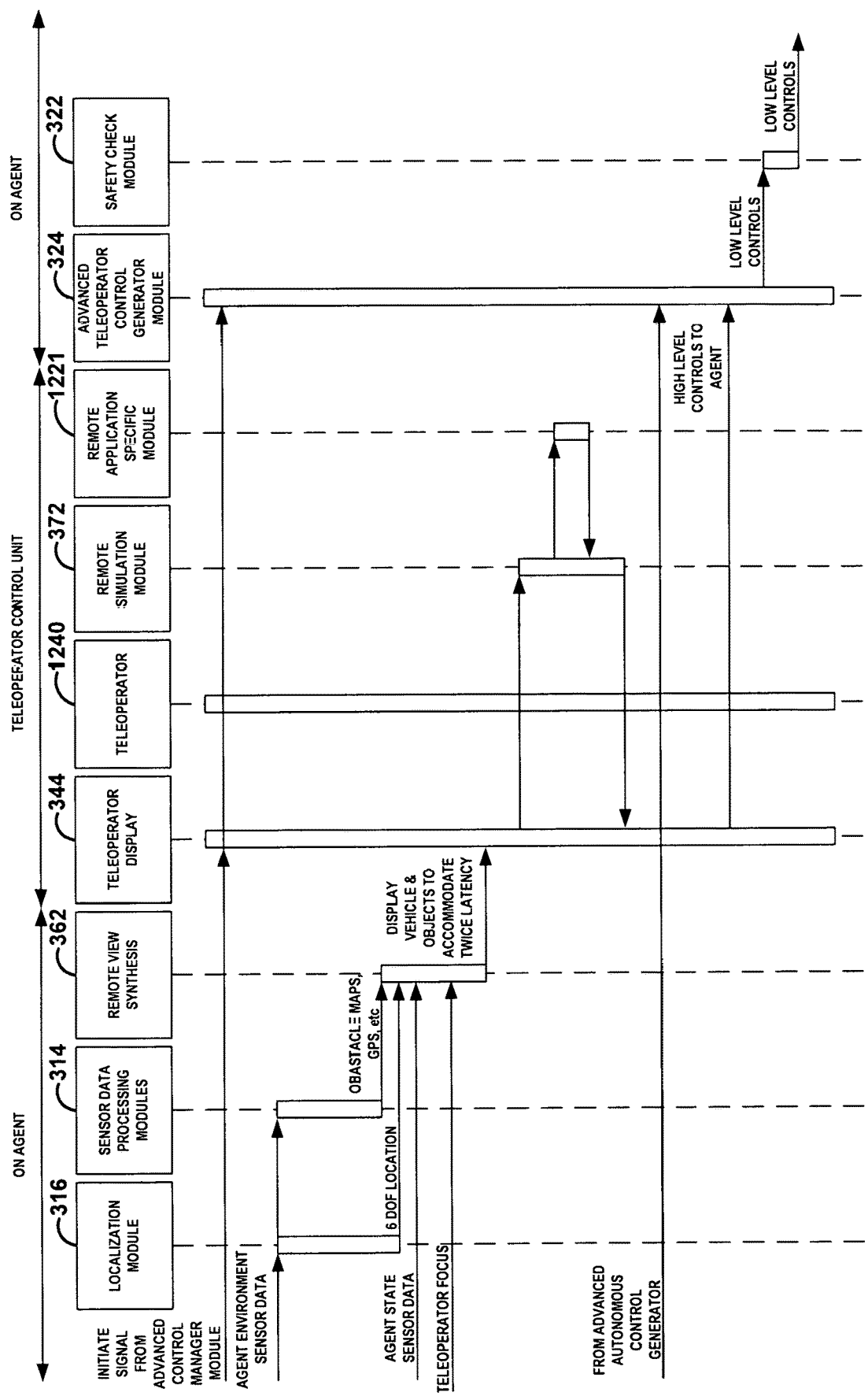
FIG. 12 is a conceptual diagram illustrating an example operation of a hybrid control system for an agent for a control paradigm handoff in accordance with the techniques of the disclosure.
Figure 15A:
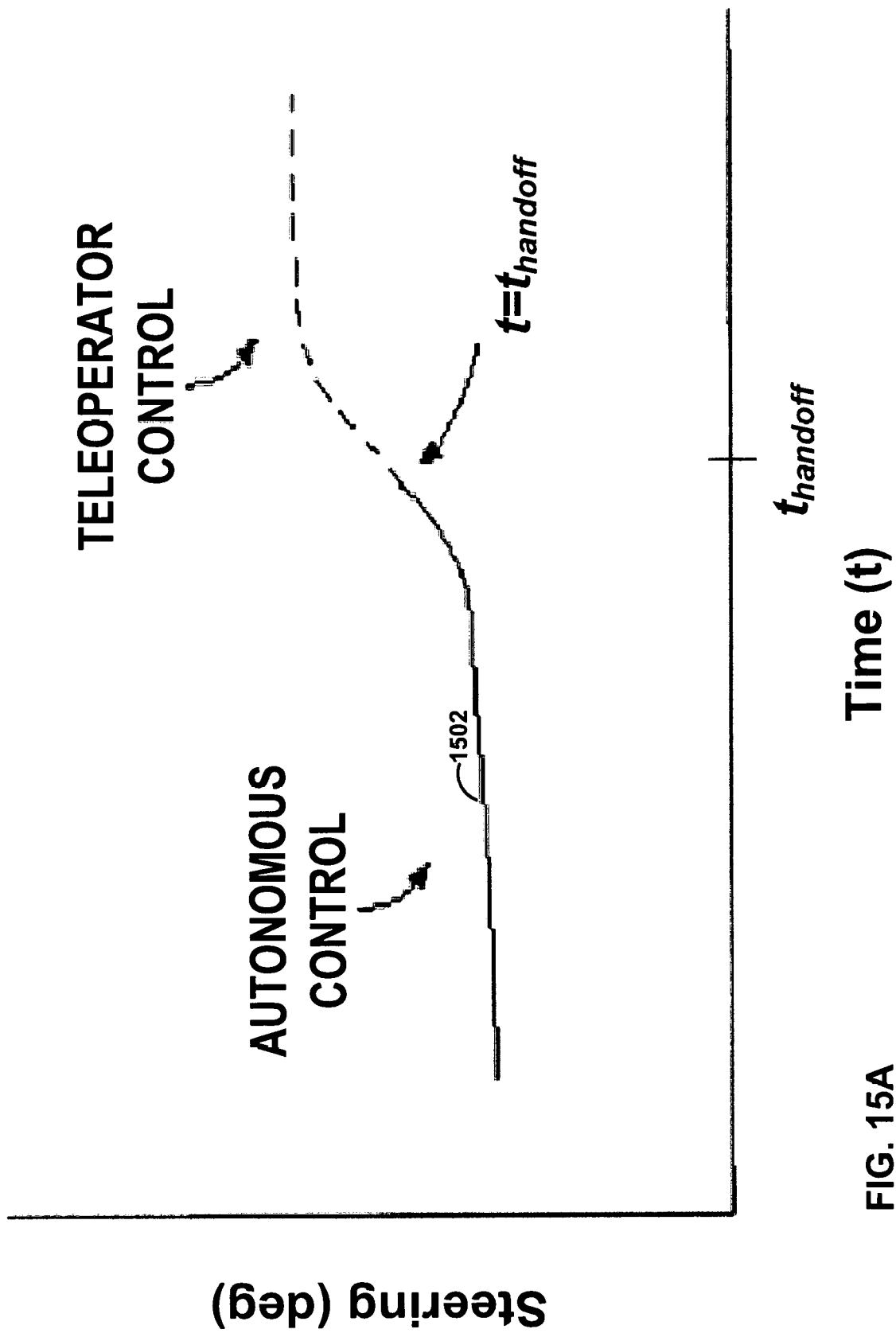
FIG. 15A is a first conceptual diagram illustrating an example control paradigm handoff in accordance with the techniques of the disclosure.

In terms of implementation, in FIG. 12, the signal from advanced control manager module 358 may be fed into advanced tele-operator control generator module 324. Eqn. 6 and 7 may then be implemented within advanced tele-operator control generator module 324. FIG. 15A illustrates this concept. In FIG. 15, steering angle 1502 is illustrated over time. For $t < t = t_{handoff}$, the controls are generated by advanced autonomous control generator module 312 (solid line). Regardless of the state of the actuator within the TCU (such as without limitation the position of the actuator) that controls the steering, at $t_{handoff}$ eqn. 6 is enforced. The dashed line depicts the time progression of the tele-operator control. Equation 7 gets reinforced beyond $t_{handoff}$. Here any steering control the tele-operator issues is applied as a deviation from the control value that existed at $t_{handoff}$.

Although the example above is for handoff from autonomous control to tele-operator control, the similar concept may be applied going the other direction or generally from any control paradigm to a second paradigm.

In some examples the simulation tools in the agent and on the tele-operator side, allows "pseudo control" where the handoff has not actually occurred but the display simulates as if it were. This allows for modules to compare the simulated control with the actual active control and try and correct for deviations. As an example, going from an autonomous control to a tele-operated control, the simulation in the TCU may display the actual position or state of the agent and may also simulate what may happen of the control that was being issued by the tele-operator was to be applied. The tele-operator looking at such a display may be able to modify the controls to achieve better alignment.

Figure 15B:
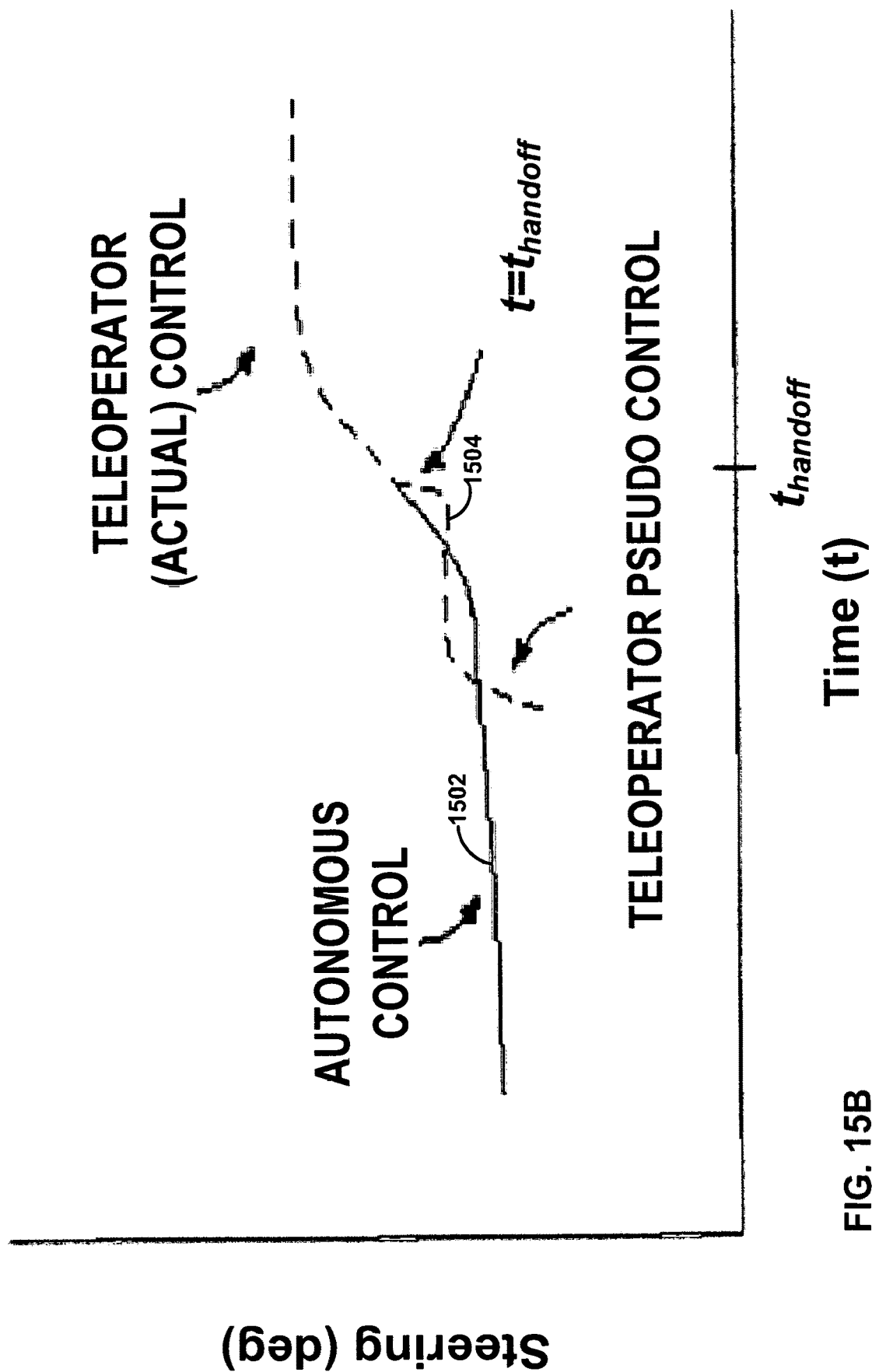
FIG. 15B is a second conceptual diagram illustrating an example control paradigm handoff in accordance with the techniques of the disclosure.

In FIG. 15B, the solid line depicts the time course of the autonomous control as in FIG. 15A. However here, the tele-operator is issuing pseudo controls and trying to match the autonomous controller. At $t_{handoff}$ the controls match and the handoff is successfully executed. The tele-operator control unit may have a display that graphically displays the autonomous control and the pseudo control 1504. With a visual aid, the tele-operator may find it more convenient to match the autonomous control. The advanced controller manager may not execute the handoff until the two controls match. This in this case, the handoff procedure may be commenced by the advanced controller manager prior to when is needed according to the master plan.

Cloud System and the Concept of Using Previously Gathered Data

The advanced control systems discussed above may be coupled to a cloud system. It is anticipated that multiple agents and multiple tele-operated control units may be connected to the cloud. An asset management system may be coupled to the cloud system that optimizes how best to utilize the resources. This may include matching up agents to tele-operators who are familiar with the task the agent has to perform in a specific environment.

Figure 13:
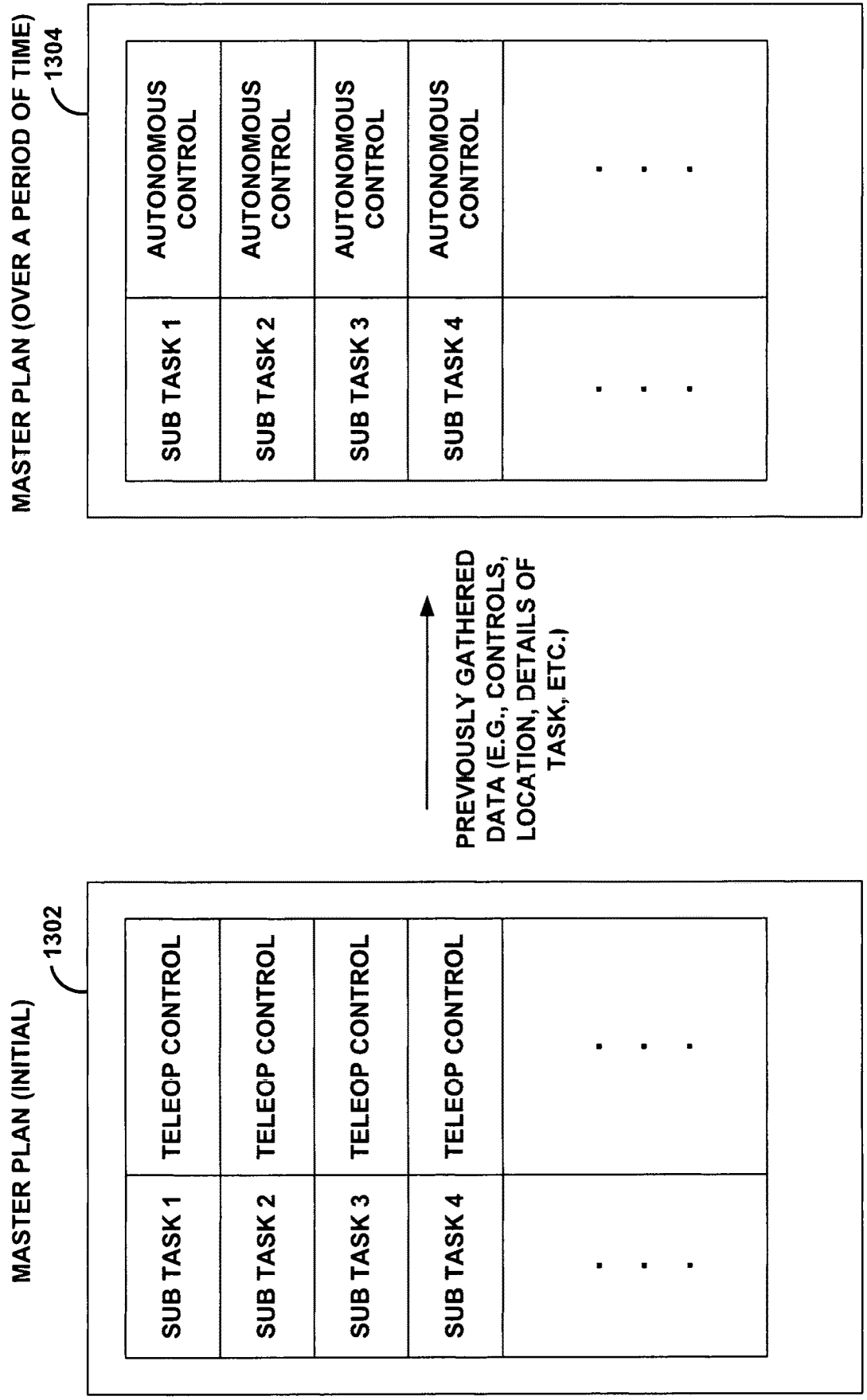
FIG. 13 is a conceptual diagram illustrating an example initial master plan and an example constructed master plan in accordance with the techniques of the disclosure.

Another function of the cloud system may include collecting the controls and other information such as but not limited to the updated maps, analyze the information so that the task of performing an activity successfully done in the past, becomes more efficient or may be used as a safety check. In a specific example FIGS. 4A-4C described the concept of a master table. In FIG. 13, the benefit of a collecting the control data and other data is illustrated. Table 1302 illustrates an initial master plan where all the sub-tasks require a teleoperation control. By gathering data for each sub-task, such as but not limited to control data, sensed data, agent state data, environmental data, over time table 1304 may be constructed where more tasks may be done autonomously. Said differently, task planner 374 may generate the master plan using historical information. For instance, task planner 374 may build up a map of operations that maps a location relative to the map to at least one of: 1) controls performed by the tele-operator or 2) autonomously-performed low-level controls. For example, for a high level task to turn right, advanced autonomous control generator module 312 may generate a low-level control to turn one degree right. In some examples, task planner 374 may generate the master plan based on capability information for agent 300A. In some examples, task planner 374 may generate the master plan based on a master plan template for a plurality of vehicles. Although table 1304 illustrates that all the sub tasks are performed under autonomous control, there may be intermediate stages where some tasks still require tele-operator control.

Figure 16:
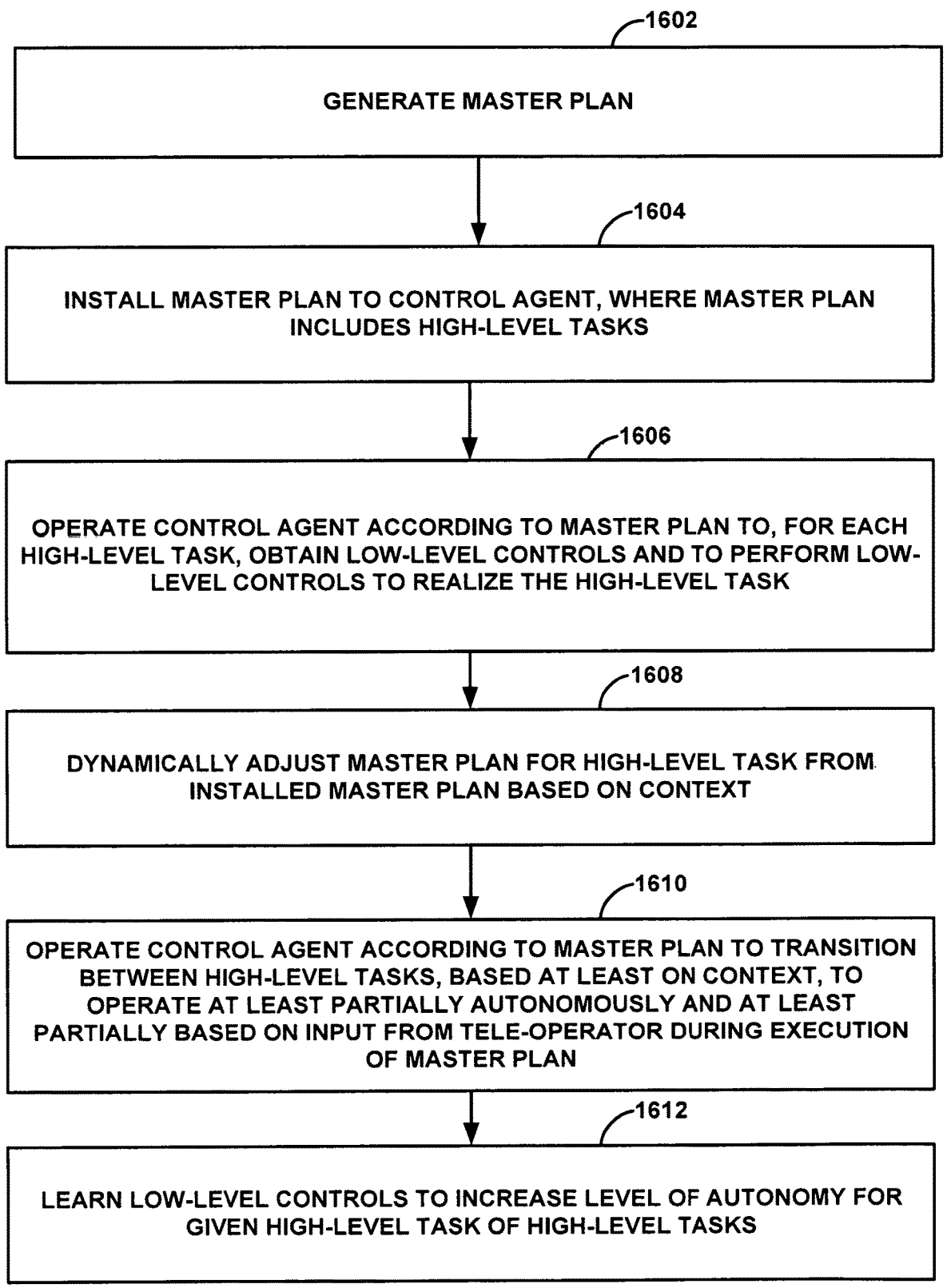
FIG. 16 is a flow chart illustrating an example operation of a hybrid control system in accordance with the techniques of the disclosure.

FIG. 16 is a flow chart illustrating an example operation of a hybrid control system in accordance with the techniques of the disclosure. Initially, task planner 374 may generate a master plan (1602). For example, task planner 374 may build up a map of operations that maps global locations to autonomously-performed low-level controls. In some examples, task planner 374 may generate a master plan based on historical information that describes previous tele-operated and or at least partially-autonomous operations of one or more agents of the hybrid control system. For instance, the hybrid control system may store and obtain records of previous tele-operated tasks to train a machine learning system to determine one or more low-level tasks for a high-level task to be performed by the agent at least partially autonomously. In such cases, the learned low-level tasks may be associated with confidence scores that may contribute to a transition operation depending on the context of the agent. In some examples, task planner 374 may generate a master plan based on a master plan template for a plurality of agents. In some examples, a single control agent (e.g., agent 300A) can control multiple vehicles. In some examples, task planner 374 may generate a master plan based on capability information for the control agent.

Advanced autonomous control generator module 312 may install the master plan to the control agent (1604). In some examples, the master plan includes a plurality of high-level tasks. The control agent may include, for example, a robot or a truck. Advanced autonomous control generator module 312 operates according to the master plan to, for each high-level task of the high-level tasks, obtain one or more low-level controls and to perform the one or more low-level controls to realize the high-level task (1606). Advanced autonomous control generator module 312 dynamically adjusts the master plan for a high-level task from the installed master plan based on the context (1608). For example, advanced autonomous control generator module 312 may trigger back to operating at least partially based on input from the tele-operator due to one or more of a safety environment of the control agent or an uncertainty of a scene comprising the control agent. In some examples, the context includes one or more of a geolocation of the control agent (according to a geofence for example), a state of the control agent, an uncertainty of a scene comprising the control agent, an environmental condition, confidence scores based on learned behavior, or a quality of a communication session (e.g., cellular coverage, cellular reception, or latency for communications in a cellular session).

Advanced autonomous control generator module 312 operates according to the master plan to transition between the plurality of high-level tasks thereby causing a seamless transition between operating at least partially autonomously and operating at least partially based on input from the tele-operator, based at least on a context, to operate at least partially autonomously and at least partially based on input from the tele-operator during execution of the master plan (1610). For example, advanced autonomous control generator module 312 may transition between the plurality of high-level tasks remotely initiated and locally initiated. In some examples, advanced autonomous control generator module 312 may receive at least one low-level control of the one or more low-level controls obtained for a first high-level task of the one or more high-level tasks from the tele-operator. In this example, advanced autonomous control generator module 312 may autonomously determine at least one low-level control of the one or more low-level controls obtained for a second high-level task of the one or more high-level tasks. Local machine learning module 360 and/or remote machine learning module 380 learns low-level controls to increase a level of autonomy for a given high-level task of the one or more high-level tasks (1612).

The above examples, details, and scenarios are provided for illustration, and are not intended to limit the disclosure in any way. Those of ordinary skill in the art, with the included descriptions, should be able to implement appropriate functionality without undue experimentation. References in the specification to "an embodiment," "configuration," "version," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine. For example, a machine-readable medium may include any suitable form of volatile or non-volatile memory.

Modules, data structures, function blocks, and the like are referred to as such for ease of discussion, and are not intended to imply that any specific implementation details are required. For example, any of the described modules and/or data structures may be combined or divided into sub-modules, sub-processes or other units of computer code or data as may be required by a particular design or implementation. In the drawings, specific arrangements or orderings of schematic elements may be shown for ease of description. However, the specific ordering or arrangement of such elements is not meant to imply that a particular order or sequence of processing, or separation of processes, is required in all embodiments.

In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure. This disclosure is to be considered as exemplary and not restrictive in character, and all changes and modifications that come within the spirit of the disclosure are desired to be protected.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A hybrid control system comprising:
a control agent; and
a control engine comprising one or more processors, wherein the control engine is configured to:
install a master plan to the control agent, wherein the master plan comprises a plurality of high-level tasks,
wherein the plurality of high-level tasks includes at least one task for which the control agent is operating at least partially autonomously,
wherein the plurality of high-level tasks for the control agent includes at least one task for which the control agent is operating at least partially based on input from a tele-operator,
wherein the control agent is configured to operate according to the master plan to, for each high-level task of the high-level tasks, obtain or generate one or more low-level controls and to perform the one or more low-level controls to realize the high-level task,
wherein, to obtain or generate the one or more low-level controls, the control agent is configured to dynamically adjust, in real-time, the master plan for a high-level task of the one or more high-level tasks from the installed master plan based on an uncertainty of a scene comprising the control agent,
wherein, to dynamically adjust the master plan, the control agent is configured to dynamically adjust, based on the uncertainty of the scene, the high-level task of the one or more high-level tasks from operating at least partially autonomously to operating at least partially based on input from the tele-operator when at least one control of the low-level controls operating at least partially autonomously matches a control obtained based on input from the tele-operator, and wherein the control agent is configured to operate according to the adjusted master plan to transition between the plurality of high-level tasks thereby causing a seamless transition between operating at least partially autonomously and operating at least partially based on input from the tele-operator, based at least on a context for the control agent, to operate at least partially autonomously and at least partially based on input from the tele-operator during execution of the adjusted master plan.

2. The system of claim 1, wherein at least one low-level control of the one or more low-level controls obtained for a first high-level task of the one or more high-level tasks is received from the tele-operator, and wherein at least one low-level control of the one or more low-level controls obtained for a second high-level task of the one or more high-level tasks is autonomously determined by the control agent.

3. The system of claim 1, wherein the context comprises one or more of a geolocation of the control agent, a state of the control agent, communication conditions, or operator state.

4. The system of claim 1, wherein the control engine is configured to:

generate the master plan using one or more of historical information, information regarding state of the control agent including either a success state or failure state, capability information for the control agent, or a master plan template for a plurality of control agents.

5. The system of claim 1, wherein the control engine is configured to:

build up a map of operations that maps a location relative to the map to at least one of: 1) controls performed by the tele-operator or 2) autonomously-performed low-level controls.

6. The system of claim 1, wherein the control engine comprises:

a simulator module configured to perform a series of simulations to determine a set of low-level controls that best achieves a high-level task of the one or more high-level tasks by simulating commands produced by the set of low-level controls and determining whether the simulated commands produced by the set of low-level controls achieves a threshold of success.

7. The system of claim 1, wherein the control engine is configured to:

incorporate latency information into calculations performed by a remote simulation module such that one or more commands issued by the tele-operator arrive at the agent when they are needed.

8. The system of claim 1, wherein the control agent is configured to:

learn low-level controls to increase a level of autonomy for a given high-level task of the one or more high-level tasks.

9. The system of claim 1, wherein the control agent comprises a vehicle, a truck, a general-purpose robot, a service robot, a drone, or a warehouse robot.

10. The system of claim 1, wherein, to operate according to the adjusted master plan, the control agent is configured to:

transition between one or more remotely initiated high-level tasks of the plurality of high-level tasks and one or more locally initiated high-level tasks of the plurality of high-level tasks.

11. The system of claim 1, wherein the control agent is configured to:

output the adjusted master plan to an external system for use by another control agent.

12. The system of claim 1, wherein the control agent is configured to:

determine a low-level control of the one or more low-level controls based on input from the tele-operator.

13. A method for a hybrid control system comprising:

installing, by a control engine comprising one or more processors, a master plan to a control agent, wherein the master plan comprises a plurality of high-level tasks, wherein the plurality of high-level tasks includes at least one task for which the control agent is operating at least partially autonomously, wherein the plurality of high-level tasks includes at least one task for which the control agent is operating at least partially based on input from a tele-operator, operating, by the control agent, according to the master plan to, for each high-level task of the high-level tasks, obtain or generate one or more low-level controls and to perform the one or more low-level controls to realize the high-level task, wherein operating according to the master plan comprises dynamically adjusting, in real-time, the master plan for a high-level task of the one or more high-level tasks from the installed master plan based on an uncertainty of a scene comprising the control agent, wherein dynamically adjusting the master plan comprises dynamically adjusting, based on the uncertainty of the scene, the high-level task of the one or more high-level tasks from operating at least partially autonomously to operating at least partially based on input from the tele-operator when at least one control of the low-level controls operating at least partially autonomously matches a control obtained based on input from the tele-operator, and operating, by the control agent, according to the adjusted master plan to transition between the plurality of high-level tasks thereby causing a seamless transition between operating at least partially autonomously and operating at least partially based on input from the tele-operator, based at least on a context for the control agent, to operate at least partially autonomously and at least partially based on input from the tele-operator during execution of the adjusted master plan.

14. The method of claim 13, wherein at least one low-level control of the one or more low-level controls obtained for a first high-level task of the one or more high-level tasks is received from the tele-operator, and wherein at least one low-level control of the one or more low-level controls obtained for a second high-level task of the one or more high-level tasks is autonomously determined by the control agent.

15. The method of claim 13, wherein the context comprises one or more of a geolocation of the control agent, a state of the control agent, communication conditions, or operator state.

16. A non-transitory computer-readable medium including instructions that, when executed, cause one or more processors to:

install a master plan to a control agent, wherein the master plan comprises a plurality of high-level tasks, wherein the plurality of high-level tasks includes at least one task for which the control agent is operating at least partially autonomously, wherein the plurality of high-level tasks for the control agent includes at least one task for which the control agent is operating at least partially based on input from a tele-operator, operate the control agent according to the master plan to, for each high-level task of the high-level tasks, obtain or generate one or more low-level controls and to perform the one or more low-level controls to realize the high-level task, wherein, to obtain or generate the one or more low-level controls, the control agent is configured to dynamically adjust, in real-time, the master plan for a high-level task of the one or more high-level tasks from the installed master plan based on an uncertainty of a scene comprising the control agent, wherein, to dynamically adjust the master plan, the control agent is configured to dynamically adjust, based on the uncertainty of the scene, the high-level task of the one or more high-level tasks from operating at least partially autonomously to operating at least partially based on input from the tele-operator when at least one control of the low-level controls operating at least partially autonomously matches a control obtained based on input from the tele-operator, and operate the control agent according to the adjusted master plan to transition between the plurality of high-level tasks thereby causing a seamless transition between operating at least partially autonomously and operating at least partially based on input from the tele-operator, based at least on a context for the control agent, to operate at least partially autonomously and at least partially based on input from the tele-operator during execution of the adjusted master plan.

17. The system of claim 1, wherein the context comprises operator experience.

18. The system of claim 1,
wherein the control agent is configured to dynamically adjust the master plan further based on a confidence score associated with the one or more low-level controls for the high-level task; and
wherein the control agent is configured to generate the one or more low-level controls for the high-level task based on a learned behavior.

19. The system of claim 1, wherein the uncertainty of the scene comprises an uncertainty of one or more of:
one or more of static objects in the scene; or
one or more dynamic objects in the scene.

20. The system of claim 1, wherein operating at least partially autonomously comprises operating without user input from the tele-operator.

* * * * *